United States Patent

Nonaka et al.

[11] Patent Number: 5,851,666
[45] Date of Patent: *Dec. 22, 1998

[54] PLASTIC OPTICAL FIBER PREFORM, AND PROCESS AND APPARATUS FOR PRODUCING THE SAME

[75] Inventors: Tsuyoshi Nonaka; Toshifumi Hosoya; Yuji Kobayashi; Yasuo Matsuda, all of Yokohama, Japan

[73] Assignee: Sumitomo Electric Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 775,881

[22] Filed: Jan. 2, 1997

Related U.S. Application Data

[62] Division of Ser. No. 381,875, filed as PCT/JP94/00963 Jun. 14, 1994, Pat. No. 5,614,253.

[51] Int. Cl.$^6$ .............................. D02G 3/00; B32B 15/00; B32B 27/00
[52] U.S. Cl. .......................... 428/380; 428/383; 428/373
[58] Field of Search .................................... 428/380, 383, 428/373

[56] References Cited

U.S. PATENT DOCUMENTS

| | | | |
|---|---|---|---|
| 4,334,903 | 6/1982 | MacChesney et al. | 65/3.12 |
| 4,529,427 | 7/1985 | French | 65/3.12 |
| 4,568,146 | 2/1986 | Ueba et al. | 350/96.34 |
| 4,692,347 | 9/1987 | Yasuda | 427/40 |
| 4,836,642 | 6/1989 | Matsumoto et al. | 428/383 |
| 4,900,623 | 2/1990 | Kohn | 428/336 |
| 4,937,029 | 6/1990 | Ishiharada et al. | 264/1.4 |
| 4,989,947 | 2/1991 | Sasaki et al. | 428/373 |
| 5,206,926 | 4/1993 | Yamamoto et al. | 385/128 |
| 5,614,253 | 3/1997 | Nanaka et al. | 427/163.2 |

FOREIGN PATENT DOCUMENTS

| | | |
|---|---|---|
| WO8701071 | 2/1987 | European Pat. Off. . |
| 52-5857 | 2/1977 | Japan . |
| 54-5743 | 1/1979 | Japan . |
| 54-30301 | 9/1979 | Japan . |
| 56-66807 | 6/1981 | Japan . |
| 58-178302 | 10/1983 | Japan . |
| 59-9603 | 1/1984 | Japan . |
| 60-57811 | 4/1985 | Japan . |
| 60-119509 | 6/1985 | Japan . |
| 60-119510 | 6/1985 | Japan . |
| 60-230104 | 11/1985 | Japan . |
| 61-6604 | 1/1986 | Japan . |
| 61-130904 | 6/1986 | Japan . |
| 61-162008 | 7/1986 | Japan . |
| 63-500685 | 3/1988 | Japan . |
| 2-16504 | 1/1990 | Japan . |
| 497302 | 3/1992 | Japan . |
| 4-124602 | 4/1992 | Japan . |
| 4-190204 | 7/1992 | Japan . |
| 63533 | 1/1994 | Japan . |
| 6360403 | 3/1998 | Japan . |

OTHER PUBLICATIONS

Ishigure et al, Improvements in optical loss of High Bandwith GI Polymer optical fiber, Polymer Preprints Japan vol. 41, No. 7(1992), pp. 2942–2944.

*Primary Examiner*—Newton Edwards
*Attorney, Agent, or Firm*—Foley & Lardner

[57] ABSTRACT

A process for producing a preform for elastic optical fiber having a refractive index distribution in which the refractive index is gradually decreased from the center of the preform toward the outer periphery thereof, by depositing a deposition layer comprising a polymer A (refractive index: $N_a$) and a refractive index modifier having a refractive index different from that of the polymer A onto an inner surface of a hollow cylindrical member rotating about an axis thereof, by use of vapor-phase deposition based on a CVD (Chemical Vapor Deposition) process, or a coating process. A plastic optical fiber preform comprising deposition layers having a gradually increasing refractive index distribution is formed by changing the mixing ratio between the polymer A and the refractive index modifier constituting the deposition layer.

19 Claims, 15 Drawing Sheets

DIAGRAM OF REFRACTIVE
INDEX DISTRIBUTION

DIAGRAM OF GI-TYPE REFRACTIVE
INDEX DISTRIBUTION

DIAGRAM OF GI-TYPE REFRACTIVE
INDEX DISTRIBUTION

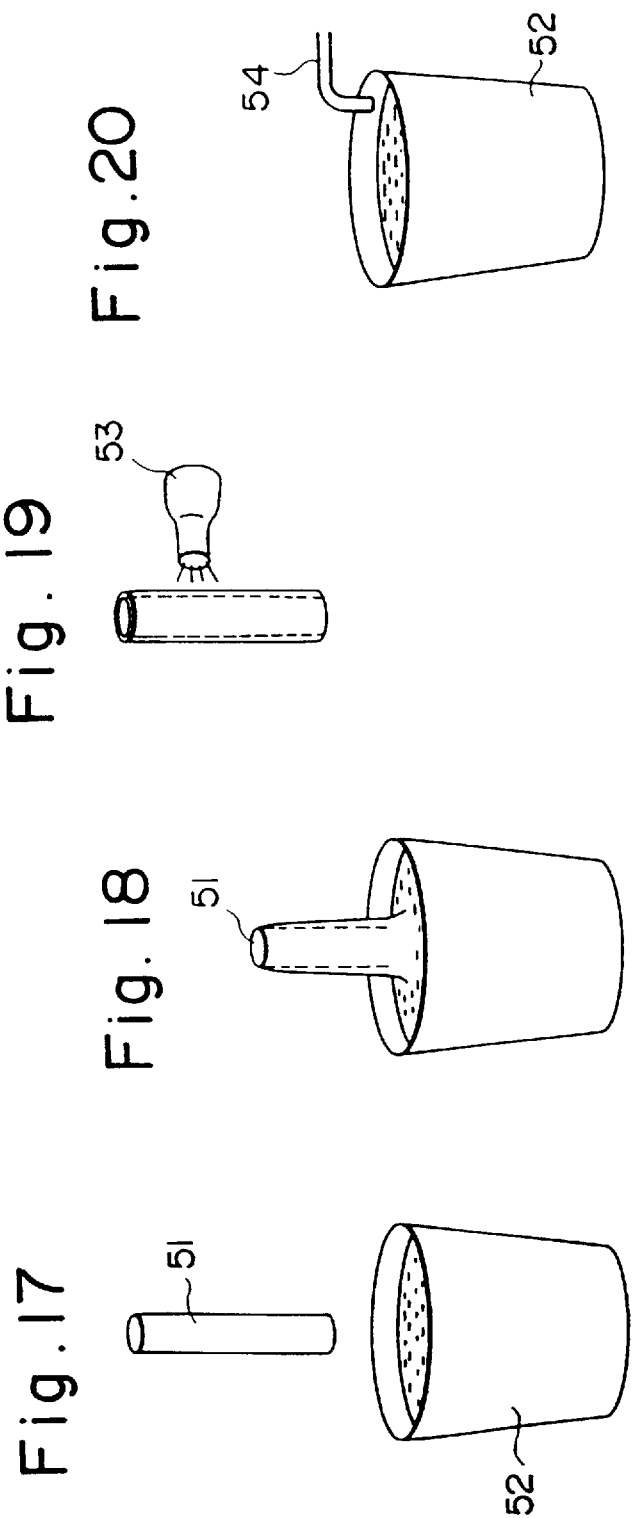

REFRACTIVE-INDEX DISTRIBUTION OF BBP-DOPED PMMA GI POF (A) : MMA/BBP = 7/1
(B) : MMA/BBP = 6/1
(C) : MMA/BBP = 5/1

DIAGRAM OF SI-TYPE REFRACTIVE INDEX DISTRIBUTION

DIAGRAM OF GI-TYPE REFRACTIVE INDEX DISTRIBUTION

PLASTIC OPTICAL FIBER PREFORM, AND PROCESS AND APPARATUS FOR PRODUCING THE SAME

This application is a division of application Ser. No. 08/381,875, filed Feb. 16, 1995, now U.S. Pat. No. 5,614,253 which is the National Stage application of International application Ser. No. PCT/JP94/00963, which was filed on Jun. 14, 1994 and which designated the United States.

1. Technical Field

The present invention relates to a preform for plastic optical fiber, a process and an apparatus for producing a plastic optical fiber, and a process for the drawing of a plastic optical fiber.

2. Background Art

A plastic optical fiber comprising a core and a cladding both of which comprise a plastic is rather suitable for an optical transmission line to be used for a short distance such that the transmission loss in the line disposed between devices for sending and receiving an optical signal poses substantially no problem (for example, that between electronic devices), as compared with a glass optical fiber. In addition, since a plastic optical fiber can generally be produced at a lower cost than that of a glass optical fiber, such a fiber is widely used as an optical transmission line for a short distance. Thus, the importance of a plastic optical fiber has been increased, particularly in view of a project or design for a next-generation communication network such as LAN (local area network) and ISDN (integrated service digital network).

Heretofore, there has been out into practical use a plastic optical fiber 1, as shown in a schematic perspective view of FIG. 23, which comprises a core 2 comprising a resin such as PMMA (polymethyl methacrylate resin), PC (polycarbonate resin), or a copolymer thereof; and a cladding 3 comprising a fluorine-containing resin, etc., and has a refractive index distribution (profile) as shown in FIG. 24, i.e., a step-index (SI) type optical fiber.

In addition, as an optical fiber which is capable of transmitting a larger quantity of information per unit time than the above-mentioned SI-type optical fiber, there has been proposed a graded-index (GI) type optical fiber having a refractive index distribution as shown in FIG. 25. Such a GI-type optical fiber is disclosed in Japanese Patent Publication (KOKOKU) Nos. 5857/1977 (Sho 52-5857) and 30301/1979 (Sho 54-30301), and Japanese Laid-open Patent Application (KOKAI) Nos. 130904/1986 (Sho 61-130904) and 162008/1986 (Sho 61-162008). However, these optical fibers still have various unsolved problems in view of the production thereof, etc., and an optical fiber having a desired property has not been obtained yet.

More specifically, in the conventional plastic optical fibers, since the refractive index distribution has been formed by utilizing a special chemical reaction such as one employing a difference in reactivity, and one employing a gel effect, there has been a severe limitation on the conditions such as the size of a preform, and the kind of a material, in view of the provision of a desired refractive index. Accordingly, the conventional plastic optical fibers have posed a problem such that mass production thereof is difficult or a fiber material having excellent transmission property and high reliability is difficult to be obtained.

Further, in the conventional optical fibers as described above, it is difficult to freely control the reaction for providing the refractive index distribution, and therefore it has been difficult to obtain a fiber having an ideal GI-type refractive index distribution in a good yield.

Furthermore, Japanese Laid-Open Patent Application No. 16504/1990 (Hei 2-16504) discloses a process for producing a plastic optical fiber by concentrically extruding a laminate product of two or more species of polymerizable mixtures for providing mutually different indices. However, according to the present inventors' investigation, such a process has following problems.

More specifically, since the above process is a laminating-extrusion process and it can provide extrusion steps corresponding to only about ten layers, the resultant product is inevitably caused to have a stepped-type refractive index distribution. When an optical fiber having such a stepped refractive index distribution is used, it is difficult to transmit a large quantity of information. Further, in the above process, it is suggested that a continuous and smooth refractive index distribution can be provided by further diffusing a monomer into the product after the laminating-extrusion process. However, when such monomer diffusion is employed, the number of the production steps is increased and the resultant productivity becomes low. In addition, since the above process includes an operation for conducting monomer diffusion the control of which is difficult, it is difficult to provide an ideal GI-type refractive index distribution.

Further, there is proposed a process for producing a preform for plastic optical fiber having a continuously changing refractive index by repetitively pouring two species of materials having mutually different refractive index differences into a hollow cylindrical member and subjecting such materials to polymerization and lamination under the action of a centrifugal force (as described in Japanese Laid-Open Patent Application No. 119509/1985 (Sho 60-119509)). However, it is not necessarily easy in this process to regulate the resultant refractive index so as to provide a desired and designed value, and the production cost tends to become somewhat higher.

In addition, Japanese Laid-Open Patent Application No. 124602/1993 (Hei 4-124602) discloses a process for producing a plastic optical fiber by subjecting a core material to fiber spinning so as to provide a predetermined diameter, and coating the resultant product with a cladding material. However, in order to produce a GI-type plastic optical fiber by such a coating operation using a cladding material, it is necessary to conduct multiple-stage coating operations, so that the production process becomes complicated.

On the other hand, it has also been proposed that a GI-type preform (base material) is prepared in advance and is subjected to hot stretching to provide a fiber (Polymer Preprints, Japan, vol. 41, No. 7, pp. 2942–2944, Autumn of 1992). It is conceivable that such a process can reduce the number of production steps and can prepare various species of fibers having different outer diameters. However, according to the present inventors' investigation, in such a process wherein the GI-type preform is simply inserted into a drawing furnace to be subjected to fiber drawing, a fluctuation in the outer diameter after the fiber drawing is liable to occur and the strength of the resultant fiber thus obtained tends to become lower than that of fiber produced by other process.

In general, in a plastic optical fiber to be actually used, a cover portion called as a jacket layer or a sheath layer is further provided on the above-described cladding layer so as to protect the main body of the plastic optical fiber (as disclosed in FIG. 1 of Japanese Laid-Open Patent Application No. 230104/1985 (Sho 60-230104)). As disclosed in Japanese Laid-Open Patent Application Nos. 178302/1983 (Sho 58-178302) and 57811/1985 (Sho 60-57811), etc., a fiber having a good heat resistance and a good weathering resistance can be provided by selecting a jacket or sheath material having a good heat resistance and a good weathering resistance.

Further, Japanese Laid-Open Patent Application No. 190204/1992 (Hei 4-190204) discloses a technique such that an inorganic filler is incorporated into a jacket layer so as to facilitate the formation of metal plating on the surface of the jacket layer.

In these conventional methods, an optical fiber preform is drawn into a fiber shape and then a cover portion is formed on the resultant fiber by utilizing a method such as die coating and extrusion, and therefore the formation of the cover portion is troublesome and the productivity becomes low, whereby the resultant production cost becomes high.

It is also theoretically conceivable that, instead of the provision of the above-mentioned cover portion, the main body of the optical fiber is caused to have a considerably large outer diameter so that the cladding layer may also function as a protect layer. In this case, however, there is posed a new problem such that the amount of a plastic material to be used per unit length is increased. Further, since the plastic material to be used for a plastic optical fiber is one having a high optical transparency which has been produced so as to provide a high purity through purification, and has a high production cost, an increase in the amount of such as plastic material to be used per unit length constitutes a factor of an increase in the production cost.

SUMMARY OF THE INVENTION

An object of the present invention is to provide a plastic optical fiber or a preform therefor, and a process and an apparatus for producing such a plastic optical fiber or a preform, which have solved the above-mentioned problems encountered in the Background Art.

Another object of the present invention is to provide a process and an apparatus for producing a plastic optical fiber or a preform therefor, which has a desired refractive index distribution and is capable of being produced easily.

A further object of the present invention is to provide a process and an apparatus for producing a plastic optical fiber or a preform therefor, which has a desired refractive index distribution and is capable of being produced at a low cost.

A further object of the present invention is to provide a (drawing) process for producing a plastic optical fiber which can maintain a sufficient mechanical strength and can assure a long-term reliability after the fiber formation.

A further object of the present invention is to provide a (drawing) process for producing a plastic optical fiber which can suppress a change in the outer diameter thereof due to heat and can assure a long-term reliability after the fiber formation.

A further object of the present invention is to provide a process for producing a plastic optical fiber having a desired refractive index distribution and having a jacket layer which is capable of being easily formed.

A further object of the present invention is to provide a process for producing a plastic optical fiber having a desired refractive index distribution and having a jacket layer which has been reduced in the production cost.

As a result of earnest study, the present inventors have found that it is very effective in achieving the above object to form, on an inner surface of a hollow cylindrical member rotating on an axis, a laminate or multi-layer structure which comprises a layer including a polymer and a material having a refractive index different from that of the polymer (hereinafter, referred to as "refractive index modifier") and in which the ratio of the polymer to the refractive index modifier is changed.

The process for producing a plastic optical fiber preform according to the present invention is based on the above discovery. More specifically the present invention provides a process for producing a preform for plastic optical fiber having a refractive index distribution in which the refractive index is gradually decreased from the center of the preform toward the outer periphery thereof, by depositing a deposition layer comprising a polymer A (refractive index: $N_a$) and a refractive index modifier having a refractive index different from that of the polymer A onto an inner surface of a hollow cylindrical member rotating about an axis thereof, by use of vapor-phase deposition based on a CVD (Chemical Vapor Deposition) process, wherein the mixing ratio between the polymer A and the refractive index modifier constituting the deposition layer is changed thereby to gradually increase the refractive index of the deposition layer.

In the above process for producing a preform for plastic optical fiber according to the present invention, it is preferred that the refractive index modifier comprises a refractive index modifier B having a refractive index ($N_b$) higher than that of the polymer A, and the mixing ratio of the refractive index modifier B constituting the deposition layer is gradually increased.

On the other hand, in the above process for producing a preform for plastic optical fiber according to the present invention, it is also possible that the refractive index modifier comprises a refractive index modifier C having a refractive index ($N_c$) lower than that of the polymer A, and the mixing ratio of the refractive index modifier C constituting the deposition layer is gradually decreased.

The present invention also provides an apparatus for producing a preform for plastic optical fiber by forming a deposition layer comprising a polymer A (refractive index: $N_a$) and a refractive index modifier having a refractive index different from that of the polymer A on an inner surface or a hollow cylindrical member, by use of vapor-phase deposition based on a CVD process, the apparatus comprising:

a rotating device for supporting the hollow cylindrical member so as to be rotatable about an axis thereof, a supply pipe located at one end portion of the hollow cylindrical member, for supplying vapor of a raw material for forming the deposition layer to the inner surface of the hollow cylindrical member, a heating device for heating the deposition layer deposited in the inside of the hollow cylindrical member, and raw material-supplying means for supplying the vapor of the raw material for forming the deposition layer to the supply pipe;

wherein the raw material-supplying means includes refractive index-regulating means for changing the mixing ratio of the refractive index modifier in the vapor of the raw material.

In the present invention, it is also possible to use a coating process instead of the above CVD process.

More specifically, the present invention further provides a process for producing a preform for plastic optical fiber having a refractive index distribution in which the refractive index is gradually decreased from the center of the preform toward the outer periphery thereof, by depositing a deposition layer comprising a polymer A (refractive index: $N_a$) and a refractive index modifier having a refractive Index different from that of the polymer A onto an inner surface of a hollow cylindrical member rotating about an axis thereof, by use of a coating process, wherein the mixing ratio between the polymer A and the refractive index modifier constituting the deposition layer is changed thereby to gradually increase the refractive index of the deposition layer.

The present invention further provides an apparatus for producing a preform for plastic optical fiber by forming a deposition layer comprising a polymer A (refractive index: $N_a$) and a refractive index modifier having a refractive index different from that of the polymer A on an inner surface of a hollow cylindrical member, by use of a coating process, the apparatus comprising:

a rotating device for supporting the hollow cylindrical member so as to be rotatable about an axis thereof, a supply pipe located at one end portion of the hollow cylindrical member, for supplying vapor of a raw material for forming the deposition layer to the inner surface of the hollow cylindrical member, a heating device for heating the deposition layer deposited in the inside of the hollow cylindrical member, and raw material-supplying means for supplying the raw material for forming the deposition layer to the supply pipe;

wherein the raw material-supplying means includes refractive index-regulating means for changing the mixing ratio of the refractive index modifier in the raw material.

In the above process for producing a preform for plastic optical fiber by use of a coating process according to the present invention, it is preferred that an initial coating solution is prepared by using the polymer A (refractive index: $N_a$) and a refractive index modifier B having a refractive index ($N_b$) higher than that of the polymer A, and the mixing ratio of the refractive index modifier B in the coating solution is gradually increased.

On the other hand, in the above process for producing a preform for plastic optical fiber according to the present invention, it is also possible that an initial coating solution is prepared by using the polymer A (refractive index: $N_a$) and a refractive index modifier C having a refractive index ($N_c$) lower than that of the polymer A, and the mixing ratio of the refractive index modifier C in the coating solution is gradually decreased.

In the process for producing an optical fiber preform according to the present invention as described above (by use of either a CVD process or a coating process), it is not necessary to utilize a special chemical reaction in the production step for the preform, and therefore the degree of freedom is markedly increased in the size of a preform to be prepared and/or the selection of kind of material to be used therefor. Consequently, according to the present invention, a preform having a size suitable for a production system may readily be produced while using a material capable of imparting an excellent property to the resultant optical fiber, and therefore it is easy to mass-produce a preform having a desired refractive index distribution and a desired property.

Particularly, the present invention has an advantage such that a non-polymerizable material capable of imparting an excellent transmission property may be selected as the above-mentioned refractive index modifier.

The present inventors have further found that in a process for drawing a GI-type preform into a fiber, the strength of the fiber is changed depending on the orientation of the polymer constituting the fiber, and have further found that it is very effective in solving the above problem in the fiber strength to appropriately adjust a drawing tension at the time of the drawing of the fiber.

Accordingly, the present invention further provides a process for forming a plastic optical fiber by drawing while melting an optical fiber preform under heating; the optical fiber preform comprising, at least, a core comprising an organic polymer and a cladding layer comprising an organic polymer and disposed on the outer circumference of the core;

wherein the drawing is conducted under a drawing tension of 10 g or more until winding-up of the optical fiber.

In addition, according to the present inventors' investigation, it has been found that in a process for drawing a GI-type preform into a fiber, a fluctuation in the outer diameter of the resultant fiber after the completion of the drawing is occurred depending on the orientation of the polymer constituting the cladding of the fiber, and that it is very effective in solving the above problem of the fluctuation in the outer diameter of the fiber after the drawing to adjust a drawing tension appropriately at the time of the drawing of the fiber.

Accordingly, the present invention further provides a process for forming a plastic optical fiber by drawing while melting an optical fiber preform under heating; the optical fiber preform comprising, at least, a core comprising an organic polymer and a cladding layer comprising an organic polymer and disposed on the outer circumference of the core;

wherein the drawing is conducted under a drawing tension of 100 g or less until winding-up of the optical fiber.

In addition, the present invention further provides a preform for elastic optical fiber, comprising:

a core comprising an organic polymer, a cladding layer comprising an organic polymer and disposed on the outer circumference of the core, and a jacket layer disposed on the outer circumference of the cladding layer;

wherein the jacket layer comprises a material which has the same quality as the material constituting the cladding layer, and has a purity lower than that of the material constituting the cladding layer.

BRIEF DESCRIPTION OF THE DRAWINGS

FIG. 17 is a schematic perspective view for illustrating a step (immersing step) in a case where an optical fiber preform having a jacket layer is prepared by a coating method using casting.

FIG. 18 is a schematic perspective view for illustrating a step (pulling-up step) in a case where an optical fiber preform having a jacket layer is prepared by a coating method using casting.

FIG. 19 is a schematic perspective view for illustrating a step (drying step) in a case where an optical fiber preform having a jacket layer is prepared by a coating method using casting.

FIG. 20 is a schematic perspective view for illustrating a step (step of adding a refractive index modifier) in a case where an optical fiber preform having a jacket layer is prepared by a coating method using casting.

DETAILED DESCRIPTION OF PREFERRED EMBODIMENTS

Figure 1:
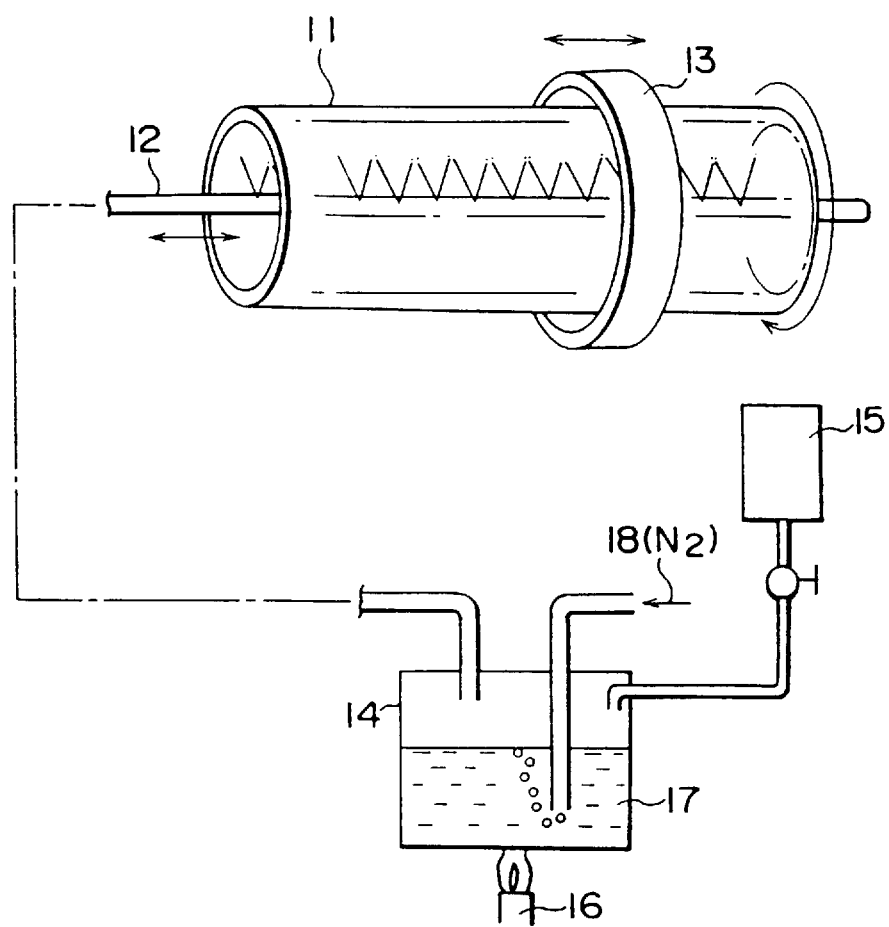
FIG. 1 is a schematic perspective view showing an embodiment of the apparatus for producing an optical fiber preform by utilizing deposition based on an inside-surface CVD process in the present invention.

Hereinbelow, the present invention will be described in detail with reference to the accompanying drawings as desired.

(Polymer)

In the present invention, as the polymer A (refractive index: $N_a$) constituting a deposition layer to be deposited on an inside surface of a hollow cylindrical member rotating about an axis, a known transparent organic polymer may be used without particular limitation. Specific example of such a polymer may include: homopolymers of methyl methacrylate (polymethyl methacrylate: PMMA), polycarbonate (PC); or a transparent copolymer of methyl methacrylate and another monomer. Preferred examples of such an "another monomer" may include: acrylic monomers such as monofunctional (meth)acrylates, fluorine-containing or fluorinated alkyl (meth)acrylates, polyfunctional (meth)acrylates, polyfunctional (meth)acrylates, acrylic acid, and methacrylic acid; and styrene-type monomers such as styrene and chlorostyrene.

Among the polymers as described above, polymethyl methacrylate (refractive index n=1.490) or polycarbonate (n=1.59) may particularly preferably be used.

(Refractive index modifier)

In the present invention, as the material (refractive index modifier) having a refractive index different from that ($N_a$) of the above polymer A, either of a refractive index modifier having a refractive index ($N_b$) higher than that of the polymer (refractive index modifier B), and a refractive index modifier having a refractive index ($N_c$) lower than that of the polymer (refractive index modifier C) may be used.

The molecular weight of the refractive index modifier is not particularly restricted, as long as it may provide a desired refractive index distribution and may be stably copresent with the above-mentioned polymer. In addition, the refractive index modifier per se may have a polymerizable functional group (for example, an unsaturated polymerizable group such as vinyl group $CH_2=CH-$). In other words, the refractive index modifier may be a monomer or a mixture thereof, or an oligomer or polymer.

The absolute value of a difference between the refractive index $N_a$ of the polymer A and the refractive index ($N_b$ or $N_c$) of the above modifier, $|N_a-N_b|$ or $|N_a-N_c|$, may preferably be 0.01 or more, more preferably 0.02 or more (particularly preferably, 0.03 or more).

In the present invention, when the above polymer A comprises nolymethyl methacrylate (PMMA) ($N_a$=n=1.49), preferred examples of the refractive index modifier to be used in combination with the polymer A may include: as the modifier B having a higher refractive index, butyl benzyl phthalate ($N_b$=n=1.536), 2-phenylethyl acetate (n=1.51), dimethyl phthalate (n=1.515), diphenyl sulfide (n=1.635), vinyl benzoate (n=1.577), benzyl methacrylate (n=1.568), and diallyl phthalate (n=1.518), etc. Among the above specific examples, vinyl benzoate, benzyl methacrylate, and diallyl phthalate are refractive index modifiers having a polymerizable functional group.

On the other hand, specific examples of the refractive index modifier C having a lower refractive index may include: hexyl acetate ($N_c$=n=1.408), bis(3,5,5-trimethylhexyl) phthalate (n=1.487), and bis(2-methylhexyl) phthalate (n=1.486), etc.

(Deposition method)

In the present invention, as the process for forming a multi-layer structure (inside-surface deposition) comprising a layer wherein the ratio of the above polymer A to the refractive index modifier is changed, on an inner surface of a hollow cylindrical member rotating about an axis, either of a vapor deposition process and a coating process may be used. In an embodiment using the vapor deposition process, a chemical vapor deposition (CVD) process may preferably be used.

(Production of preform by CVD)

Hereinbelow, there is described an embodiment of the present invention for producing a preform for plastic optical fiber by using an inside-surface CVD process with reference to FIG. 1.

FIG. 1 is a schematic perspective view snowing an embodiment of the apparatus to be usable in the production of an optical fiber preform according to the present invention (an apparatus for producing an optical fiber preform according to the present invention).

Referring to FIG. 1, this apparatus is one for producing a plastic optical fiber preform by depositing vapor of a raw material in the inside of a hollow cylindrical member through a CVD process. This apparatus comprises: a rotating device (not shown) for supporting a hollow cylindrical member 11 so as to be rotatable around an axis thereof; a supply pipe 12 (in the form of a nozzle in FIG. 1) which is located at the axis center of the hollow cylindrical member, is reciprocatingly movable in the direction of the above axis, and comprises a plurality of spraying ports so as to spray the vapor of the raw material supplied thereto onto the inner surface of the hollow cylindrical member 11; a heating device 13 (in the form of a ring heater in FIG. 1) for conducting a heat treatment of an organic raw material deposited on the inner surface of the hollow cylindrical member 11, which is located so as to be reciprocatingly movable along the axis direction; and a raw material-supplying means for supplying vapor as a raw material for the formation of a deposition layer (in the form of vapor of an organic raw material in FIG. 1). In the embodiment shown in FIG. 1, the raw material-supplying means comprises a supply vessel 14 (in the form of a supply tank in FIG. 1) and a vessel 15 for a refractive index modifier (in the form of a refractive index modifier tank in FIG. 1) for supplying the refractive index modifier to the supply vessel 14.

In the embodiment of FIG. 1, the raw material for a polymer to be supplied to the above nozzle 12, is stored as an organic raw material 17 in the supply tank 14 provided with a heating means 16 together with a solvent, and an inert gas 18 (such as $N_2$, Ar and He) is introduced into the supply tank 14 so as to supply the vapor of the above material to the nozzle 12.

On the other hand, a refractive index modifier B is stored in the refractive index modifier tank 15, and the refractive index modifier having a different refractive index is appropriately supplied to the supply tank 14 from the refractive index modifier tank 15 so as to control the resultant refractive index. More specifically, for example, as the deposition of a deposition layer comprising the above-mentioned polymer A and refractive index modifier B is repeated on the inner surface of the hollow cylindrical member 11, the refractive index modifier B is introduced into the supply tank 14 from the refractive index modifier tank 15, whereby the refractive index in the supply tank 14 is gradually changed to provide a predetermined gradient in the optical refractive index (refractive index distribution).

In the embodiment of FIG. 1, when a refractive index modifier C having a refractive index lower than that of the polymer A is used, for example, a predetermined mixture comprising the polymer A and the refractive index modifier C (a mixture having a refractive index lower than that of the polymer A per se) is placed in the supply tank 14, and the polymer A stored in the refractive index modifier tank 15 is gradually supplied to the supply tank 14 thereby to provide a desired refractive index distribution.

In the production apparatus as described above, the heating means 16 is not necessarily required. In other words, the heating means 16 may be omitted depending on the kind of the organic material to be used in combination with the apparatus.

Referring to FIG. 1, the polymer A has been poured into the supply tank 14 as an organic raw material solution 17 together with a solvent which is capable of dissolving the polymer A. As the deposition of a deposition layer comprising the polymer A and the refractive index modifier B is repeated on the inner surface of the hollow cylindrical member 11, the refractive index in the supply tank 14 is gradually changed by introducing the refractive index modifier B from the refractive index modifier tank 15 to the supply tank 14, whereby a predetermined gradient in the optical refractive index (refractive index distribution) is provided.

In addition, as shown in FIG. 1, the nozzle 12 is moved reciprocatingly in the direction of an axis while the hollow cylindrical member 11 is rotated, and the vapor of the raw material is sprayed onto the inner surface of the hollow cylindrical member 11 and heating is conducted by using the heating means 13, thereby to deposit the raw material having a gradually changing refractive index on the inner surface of the hollow cylindrical member 11. Through the above procedure, there is formed a core layer wherein the refractive index is gradually decreased in the radial direction of from the center of the resultant preform toward the outer periphery thereof.

Figure 2:
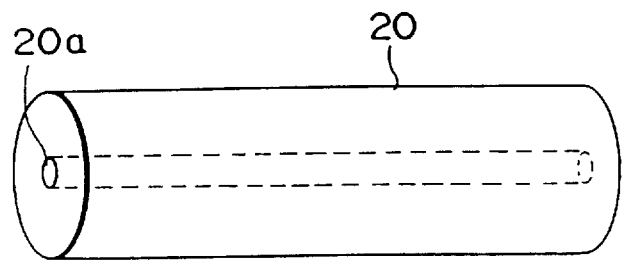
FIG. 2 is a schematic perspective view showing an example of preform provided by the deposition shown in FIG. 1.
Figure 3:
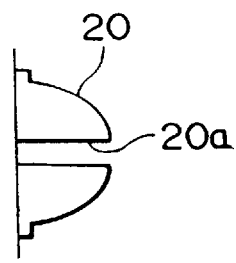
FIG. 3 is a schematic view showing a refractive index distribution of the preform shown in FIG. 2.

After the CVD deposition as described above is completed, as shown in a schematic perspective view of FIG. 2, there is provided a preform 20 having a cavity portion 20a extending In the direction of an axis, which corresponds to the nozzle 12 extending along the center axis. FIG. 3 schematically shows a profile of a refractive index distribution of the resultant preform before the collapse thereof.

Figure 4:
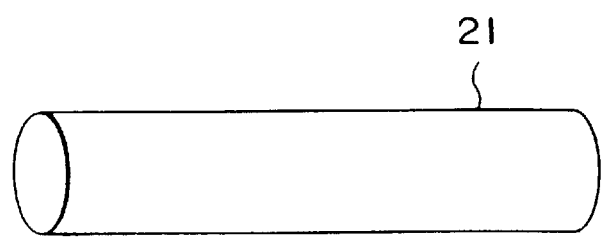
FIG. 4 is a schematic perspective view showing a state of a preform which has been formed by the deposition and then collapsed.
Figure 5:
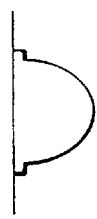
FIG. 5 is a schematic view showing a refractive index distribution at the state as shown in FIG. 4.

The preform 20 thus prepared is collapsed by melting under heating so as to fill up the above cavity 20a (FIG. 2), whereby a plastic optical fiber preform 21 as shown in a schematic perspective view of FIG. 4 is obtained. FIG. 5 is a graph schematically showing a refractive index distribution of the GI-type optical fiber preform thus obtained.

A desired plastic optical fiber may be obtained by subjecting the optical fiber preform 21 thus obtained to an ordinary fiber drawing procedure. In such a drawing procedure, a plastic fiber may for example be obtained by drawing the above fiber preform 21 under melting due to heating, while the fiber preform 21 is kept vertically.

In the present invention, a substance which is polymerizable under the action of energy such as light (for example, benzoin, benzoin methyl ether, benzoin ethyl ether, benzoin isopropyl ether, benzoin isobutyl ether, 2-methylbenzoin, benzil, benzil dimethyl ketal, benzil diethyl ketal, etc.) may be used as at least one of the raw material for the above polymer A (such as monomer) and the refractive index modifier B, and it may be subjected to polymerization (for example, photo-polymerization) under the application of energy ray such as ultraviolet ray, to fix the predetermined refractive index distribution as described above. In such an embodiment, it is particularly preferred to use an initiator for the photo-polymerization wherein cleavage may occur between different species of atoms due to light energy (the energy required for such cleavage may be smaller than that required for the cleavage of a single bond between atoms of the same kind). Specific examples of an initiator wherein cleavage may occur between different species of atoms due to light energy may include those as described below.

<Initiators wherein cleavage may occur at a single bond between different species of atoms; carbon and phosphorus atoms> benzoyl diphenylphosphine oxide
benzoyl dimethylphosphine oxide
benzoyl diethylphosphine oxide
2-methylbenzoyl diphenylphosphine oxide
2-methylbenzoyl dimethylphosphine oxide
2-methylbenzoyl diethylphosphine oxide
2,4-dimethylbenzoyl diphenylphosphine oxide
2,4-dimethylbenzoyl dimethylphosphine oxide
2,4-dimethylbenzoyl diethylphosphine oxide
2,4,6-trimethylbenzoyl diphenylphosphine oxide
2,4,6-trimethylbenzoyl dimethylphosphine oxide
2,4,6-trimethylbenzoyl diethylphosphine oxide <Initiators wherein cleavage may occur at a single bond between different species of atoms; carbon and sulfur atoms> benzoyl phenyl sulfide
2-methylbenzoyl phenyl sulfide
4-methylbenzoyl phenyl sulfide
2,4-dimethylbenzoyl phenyl sulfide
2,4,6-trimethylbenzoyl phenyl sulfide
4-chlprobenzoyl phenyl sulfide
benzoyl 2-methylphenyl sulfide
benzoyl 4-methylphenyl sulfide
benzoyl 2,4-dimethylphenyl sulfide
benzoyl 2,4,6-trimethylphenyl sulfide
benzoyl 4-chlprophenyl sulfide In a case where such a photo-polymerization is effected, a time-dependent change in the refractive index distribution based on heat, etc. may further be suppressed, thereby to provide an optical fiber which can particularly suitably be used in a region with a high temperature or considerable heating.

Further, in such an embodiment utilizing photo-polymerization, it is also possible to constitute the hollow cylindrical member 11 by use of a material capable of transmitting ultraviolet light and to supply ultraviolet light from the outside or the hollow cylindrical member 11. Such an embodiment wherein ultraviolet light is supplied from the outside of the hollow cylindrical member 11 is preferred in view of efficiency in the polymerization.

Figure 6:
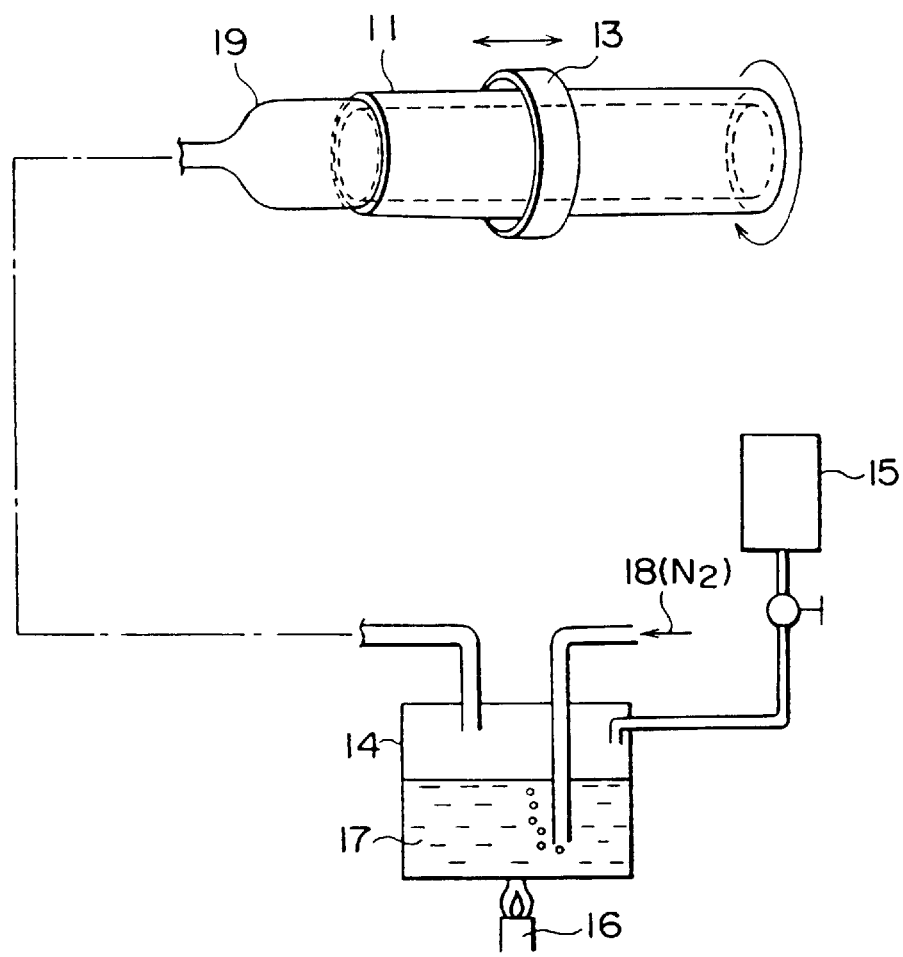
FIG. 6 is a schematic perspective view showing another embodiment of the apparatus for producing an optical fiber preform by utilizing an inside-surface CVD process in the present invention.

FIG. 6 is a schematic perspective view showing another embodiment of an apparatus (for inside-surface CVD process) for producing an optical fiber preform according to the present invention.

The embodiment shown in FIG. 6 has the same structure as that of the embodiment shown in FIG. 1, except that the nozzle 12 in FIG. 1 is omitted and a supply pipe 19 for introducing the vapor or a raw material is directly connected to an end portion of the rotating hollow cylindrical member 11 so as to directly supply the vapor of the raw material into the hollow cylindrical member 11.

(production of preform by coating method)

Figure 7:
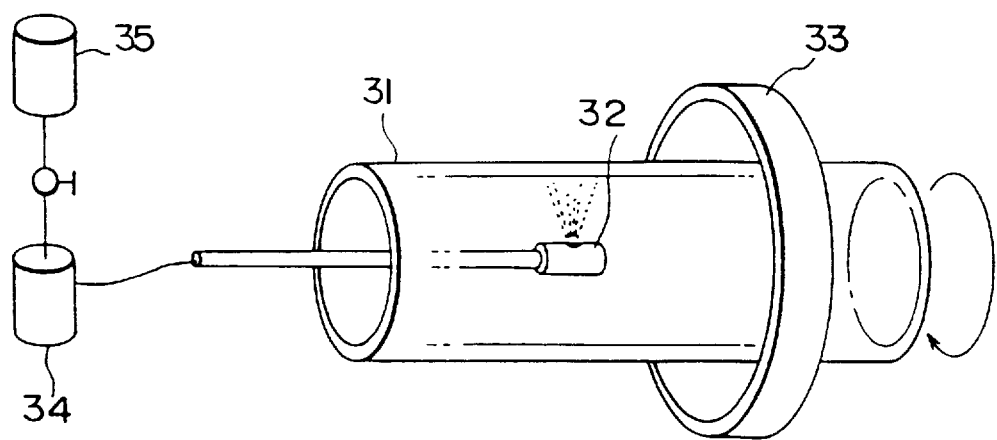
FIG. 7 is a schematic perspective view showing an embodiment of the apparatus for producing an optical fiber preform by utilizing deposition based on an inside-surface coating process in the present invention.

Next, there is described an embodiment for producing a preform for plastic optical fiber by utilizing an inside-surface coating process in the present invention with reference to FIG. 7.

FIG. 7 is a schematic perspective view showing an embodiment of an apparatus usable for the production of an optical fiber preform according to the present invention (an apparatus for producing an optical fiber preform according to the present invention).

Referring to FIG. 7, this apparatus comprises: a rotating device (not shown) for supporting a hollow cylindrical member 31 so as to be rotatable about an axis thereof; a supply pipe (in the form of a spraying nozzle in FIG. 7) 32 which is located at the axis center of the above hollow cylindrical member 31 and is movable in the direction of the axis thereof so as to apply an organic material onto the inner surface of the hollow cylindrical member 31; a driving device (in the form of a ring heater in FIG. 7) 33 for heating the organic material deposited on the inside of the hollow cylindrical member 31 to remove a solvent contained therein; a supply tank 34 for supplying the organic material; and a tank 35 for a refractive index modifier.

Hereinbelow, there is described an embodiment of the process for producing a preform for plastic optical fiber wherein the apparatus in FIG. 7 is used.

Referring to FIG. 71 the polymer A has been poured as a spraying raw material into the supply tank 34 together with a solvent which is capable of dissolving the polymer A, while a refractive index modifier B is stored in the refractive index modifier tank 35. As the spraying onto the inner surface of the hollow cylindrical member 31 is repeated, the refractive index modifier B is supplied from the refractive index modifier tank 35 to the supply tank 34 to gradually change the refractive index in the supply tank 34 so as to obtain a predetermined gradient in the optical refractive index (refractive index distribution).

In addition, as shown in FIG. 7, while the hollow cylindrical member 31 is rotated, the nozzle 32 is moved reciprocatingly in the direction of the axis of the hollow cylindrical member 31, and a raw material (composition) comprising the polymer A and the refractive index modifier B is sprayed under drying based on a dryer 33. By use of the above procedure, the spraying raw material having a gradually changing refractive index is sprayed thereby to form a core layer in which the refractive index is gradually decreased in the radial direction from the center of the preform toward the outer periphery thereof.

After the completion of the spraying, as shown in FIG. 2 described above, a desired GI-type plastic optical fiber preform is provided by subjecting the resultant product to melting under heating so as to be collapsed. The optical fiber preform thus obtained is then subjected to an ordinary fiber drawing procedure, in the same manner as in the above embodiment using the CVD process, for example, a plastic optical fiber may be obtained by subjecting the above optical fiber preform to melting under heating, while the preform is kept vertically.

Figure 8:
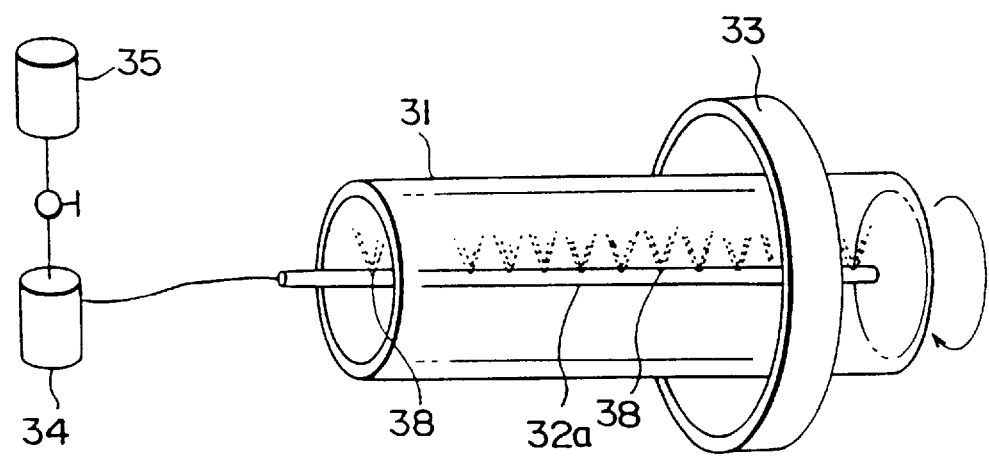
FIG. 8 is a schematic perspective view showing another embodiment of the apparatus for producing an optical fiber preform by utilizing an inside-surface coating process in the present invention.

FIG. 8 shows another embodiment of the apparatus for producing an optical fiber preform (by a coating process) according to the present invention.

The embodiment shown in FIG. 8 has the same structure as that of the embodiment shown in FIG. 7, except that, instead of the nozzle 32 movable in the direction of an axis as in FIG. 7, a nozzle 32a having a plurality of spraying ports 38 disposed along the direction of the axis of the hollow cylindrical member 31 is used, and a desired coating layer may be deposited onto an inner surface of the hollow cylindrical member 31 without moving the nozzle 32a in the axis direction.

(Fiber drawing process)

Figure 9:
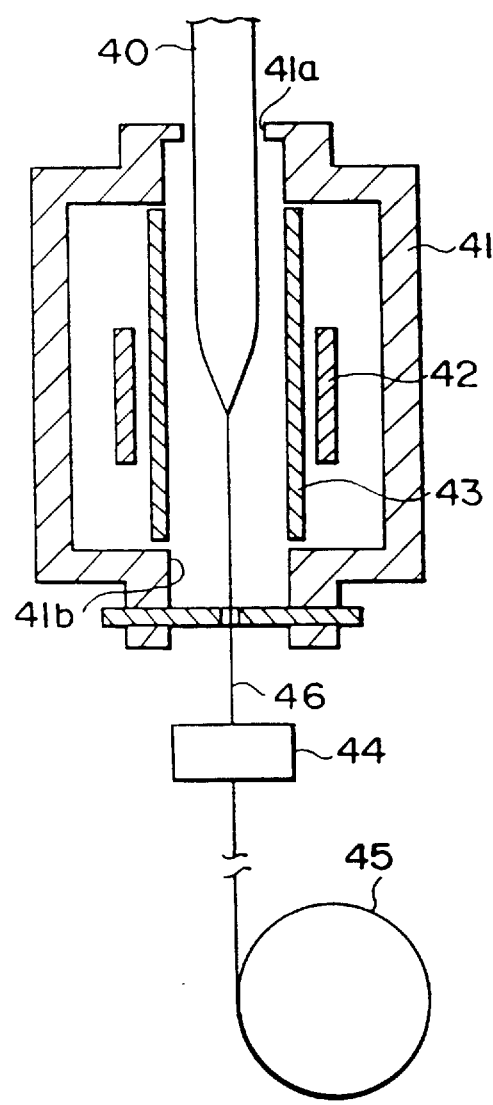
FIG. 9 is a schematic sectional view showing an embodiment of the structure of a fiber drawing furnace for drawing an optical fiber preform in the process according to the present invention.

Next, there is described a process for drawing an optical fiber preform into an optical fiber with reference to a schematic cross sectional view of FIG. 9. FIG. 9 is a schematic sectional view showing an apparatus for forming a plastic optical fiber by fiber drawing.

Referring to FIG. 9, a heater 42 and a core tube 43 are provided in the inside of the main body 41 of a fiber drawing furnace. When such a fiber drawing apparatus is used, a resin base material (preform) 40 for optical fiber is inserted into an upper opening 41a in the furnace main body 41, and melted under heating in the heating furnace 41, to be drawn or spun into a plastic optical fiber 46 having a predetermined outer diameter. The plastic optical fiber 46 thus drawn is pulled out through a lower opening 41b of the furnace 41, and then the plastic optical fiber 45 is wound up by use of a winding-up device 45 while the outer diameter of the resultant optical fiber 46 is measured by means of an outer diameter-measuring device (monitor) 44.

As the above-mentioned preform 40, one having a GI-type refractive index distribution in the core and cladding layer may preferably be used. In such a fiber drawing method, for example, it is preferred to use a preform 40 which has been prepared by using a polymethyl methacrylate (PMMA) having excellent optical transparency for a cladding and using a compound having a higher refractive index for the core. In this case, the compound having a higher refractive index to be added to the core, and the outer diameter or the length of the preform are not particularly restricted.

It is preferred to apply a drawing tension of 10 g or more to the preform (base material) 40 comprising a polymer during a period of time from the heating thereof based on the heating furnace At to the winding-up thereof by the winding-up device 45. When the degree of orientation in a polymer is low, the molecules constituting the resultant polymer product assumes a randomly-oriented structure, and therefore the strength thereof is weak under stretching. In contrast thereto, according to the present inventors' knowledge, when the drawing tension is 10 g or more, the molecules are oriented along the longitudinal direction of the resultant fiber, whereby the tensile strength of the fiber may be improved and the long-term reliability thereof may be assured.

On the other hand, the above drawing tension may preferably be 100 g or less. When the drawing tension exceeds 100 g, the resultant fiber is liable to cause shrinkage under the action of heat. According to the present inventors' knowledge, the reason for the occurrence of such a phenomenon may be considered as follows:

Thus, when the polymer constituting the cladding layer of an optical fiber is considerably oriented under the action of a drawing tension larger than 100 g, the fiber will be wound up around a reel, etc., in such a state that the cladding is so oriented. As a result, when the polymer constituting the cladding is supplied with heat, it is presumed that shrinkage occurs on the basis of the recovery of the polymer to its original state.

In a case where the cladding is shrunk in such a manner, according to the present inventors' knowledge, it is presumed that the optical fiber per se is also shrunk and a strain is applied to the optical fiber in the longitudinal direction thereof to cause a structure defect of the fiber per se thereby to increase the transmission loss.

Accordingly, in the present invention, it is preferred to employ a drawing tension of 100 g or less to prevent the considerable orientation of the polymer constituting the cladding.

According to the present inventors' knowledge, when the above-mentioned preform 40 is melted under heating to be spun, the outer diameter of the optical fiber 46 may preferably be 1000 $\mu$m or less. In a case where the outer diameter exceeds 1000 $\mu$m, a decrease in the strength is not observed even when the degree of orientation of molecules is low. On the other hand, in a case where the outer diameter is 1000 $\mu$m or less, a decrease in the strength is considerable when the degree of orientation of molecules is low. However, as described above, in a case where the drawing tension is set to be 10 g or more, the tensile strength of the fiber 46 is improved on the basis of the orientation of molecules along the longitudinal direction of the fiber thereby to assure long-term reliability, even when the outer diameter of optical fiber 46 is set to 1000 $\mu$m or less.

(Optical fiber preform)

The plastic optical fiber preform obtained by the production process according to the present invention as described above generally has a rod-like shape comprising a core and a cladding layer. In the present invention, it is preferred that a jacket layer is further formed as desired on the outer circumference of the rod comprising the core and the cladding layer, and the jacket layer comprises a material having substantially the same quality as that of an organic polymer constituting the cladding layer and having a lower purity than that of the organic polymer constituting the cladding layer.

In such an embodiment, the material constituting the jacket layer may preferably be such a polymer $B_1$ which has the same quality as that of the polymer B constituting the cladding layer and has a lower purity than that of the polymer B. Herein, "the same quality" means that the monomer constituting the material for the jacket layer is substantially common with the monomer constituting the polymer B for the cladding layer. More specifically, at least 90 mol % (more preferably, at least 95 mol %) of the monomer constituting the jacket layer is the same as the monomer constituting the polymer B for the cladding layer.

In the case of a copolymer, when the common monomers in the jacket layer and the cladding layer are respectively denoted by $M_1$ and $M_2$, the monomer constitution of the cladding layer is denoted by $\{M_1 (a_1 \text{ mol}) + M_2 (b_1 \text{ mol})\}$, and the monomer constitution of the jacket layer is denoted by $\{M_1 (a_2 \text{ mol}) + M_2 (b_2 \text{ mol})\}$ (provided that $a_1 \leq a_2$ and $b_1 \leq b_2$), the value of $(a_2+b_2)/(a_1+b_1)$ may preferably be at least 90 mol % (more preferably, at least 95 mol %).

Since the polymer B constituting the cladding layer has a high purity and contributes to light transmission, a polymer having a purity of at least 99% may preferably be used as the polymer B constituting the cladding layer. On the other hand, since the polymer $B_1$ constituting the jacket layer does not directly contribute to light transmission, a polymer having a purity of not more than 99% may preferably be used in view of cost. etc. The polymer $B_1$ may preferably have a purity of at least about 80% (more preferably, at least about 90%) in view of the adhesive property thereof with the cladding. However, this "purity" is used in a manner such that an impurity not contributing to light transmission at all (polymerization inhibitor, etc.) is excluded from the consideration of the purity. Accordingly, a component which contributes to light transmission (for example, a material to be added so as to change the refractive index) is not considered as an "impurity" relating to the evaluation of the above-mentioned purity.

As described above, in a case where a material having a low purity is used for the jacket layer, a material having a low cost (for example, a commercially available and inexpensive polymer) can be used for the jacket layer, and therefore a plastic optical fiber having a low cost but having a good transmission property may be provided even when the outer diameter of the fiber is increased.

In the present invention, it is further preferred that the material constituting the jacket layer is one having the same quality as both of the core and the cladding, in consideration of the adhesion between the cladding and the core. More specifically, in such an embodiment, a material comprising at least 90% (more preferably, at least 95%) of the component (monomer, etc.) for the core material may preferably be used as the material constituting the jacket layer. On the other hand, in view of the production cost, a material comprising 99% or less of the component (monomer, etc.) for the core material may preferably be used as the material constituting the jacket layer.

Here, when a material having the same quality as those for the core and cladding layer is used as the material constituting the jacket layer, as compared with a case wherein the jacket layer is formed by using another material of different quality, the handling property at a working site, etc., may be improved and simultaneous peeling of the jacket layer may be effectively prevented in the peeling-off of a resin layer (an outermost layer 104 in FIG. 10 as described below).

The material constituting the jacket layer may preferably have a melting point which is substantially equal to that of the core material. More specifically, when the melting point of the material for the jacket layer is denoted by $m_j$ and the melting point of the core material is denoted by $m_c$, $|m_j-m_c|$ (absolute value) may preferably be not more than 10° C. (i.e., the value of ($m_j-m_c$) may preferably be within ±10° C.).

When a material having a melting point substantially different from that of the core material is used as the material constituting the jacket layer, the cladding layer and the jacket layer are liable to be melted nonuniformly (to be melted separately) at the time of the melting of the preform during a fiber drawing operation.

Figure 10:
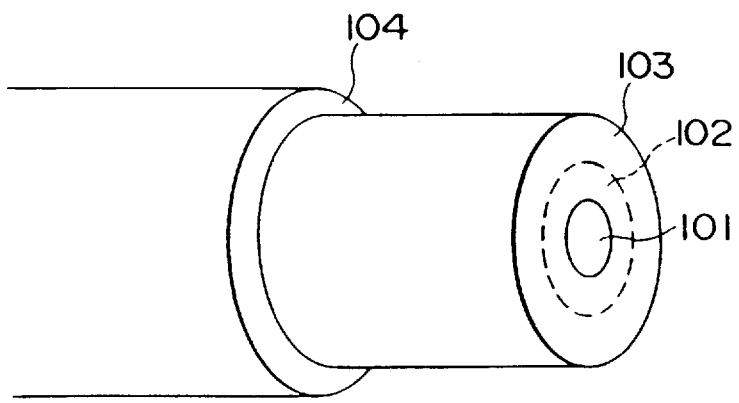
FIG. 10 is a schematic perspective view showing an example of the structure of an optical fiber having a jacket layer.

FIG. 10 is a schematic perspective view showing an embodiment of the structure of an optical fiber which has been formed by forming a preform, coating the preform with a resin layer, and further subjecting the resultant preform to fiber drawing. Referring to FIG. 10, the optical fiber in this embodiment comprises a core 101, a cladding layer 102 comprising a high-purity polymer and located or the outer circumference of the core 101, and a jacket layer 103 comprising a low-purity polymer and located on the outer circumference of the cladding layer 102.

When the jacket layer 103 is formed on the circumference of the cladding layer in the state of the preform in the above-mentioned manner, the jacket layer is simultaneously formed in the melt-drawing of the preform. Accordingly, in such an embodiment, it is not necessary to form the jacket layer by coating after the drawing, and therefore the resultant productivity is markedly improved.

Further, an outermost layer of resin layer 104 may be formed as desired on the circumference of the jacket layer 103, for the purpose of discrimination, etc. In such a case, in the present invention, it is not necessarily required to impart a function as a protecting layer to the resin layer 104, and therefore a resin which is more inexpensive as compared with that in a conventional case can be used as the material for the resin layer 104. In addition, there is a further advantage that the resin layer 104 can be made thinner.

In general, when a connector is mounted to an optical fiber for the purpose of connection, it is necessary to remove the resin layer 104 from the plastic optical fiber. However, when the fiber per se has the jacket layer 103 as in the plastic optical fiber produced according to the present invention, the fiber can maintain sufficient strength even after the removal of the resin layer 104 therefrom, and therefore such a fiber has an advantage that good strength may be maintained even in the connector portion.

In general, connecting means such as connectors are standardized in most cases. In the case of a conventional optical fiber, the main body outer diameter of which has been simply increased, it is required that even the neighborhood of the outer periphery of the fiber not contributing to transmission is constituted by using a material having a high purity, for the purpose of meeting the standard, and therefore the resultant production cost is markedly increased. In contrast thereto, according to the present invention, the production cost can be reduced by forming the jacket layer 103 having a low purity.

The process according to the present invention is particularly suitable for a case in which the plastic optical fiber to be produced is a GI-type plastic optical fiber.

More specifically, in the production of an SI-type plastic optical fiber, the fiber is generally produced by pull down a liquefied core material due to melting in most cases. On the other hand, generally in the production of a GI-type plastic optical fiber, a preform having a refractive index distribution is first prepared and the preform is drawn into a fiber, as disclosed in Japanese patent publication No. 5857/1977 (Sho 52-5857). Accordingly, the present invention has an advantage that the production of the a preform with a jacket is facilitated by conducting a jacketting step in series at the time of the formation of the GI-type preform.

It is also possible to incorporate a functional material having each of various functions, such as anti-oxidant, light absorbing agent and light-scattering agent, so as to cause the functional material to exhibit its function. These functional materials can be added to the jacket layer singly or in combination of at least two species thereof.

More specifically, for example, when an anti-oxidant (such as hindered phenol, hindered amine, aryl amine, phosphite, and thio ether) is incorporated into the jacket layer, it is possible to cause such a component to exhibit a function of preventing opacification and of preventing coloring.

Figure 11:
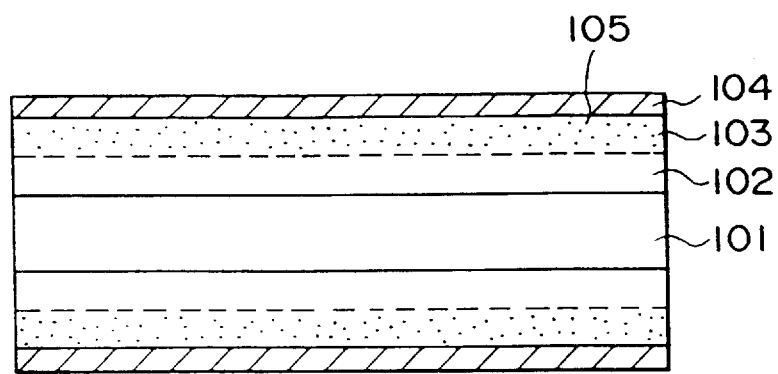
FIG. 11 is a schematic cross-sectional view showing an example of the structure of an optical fiber having a jacket layer.
Figure 12:
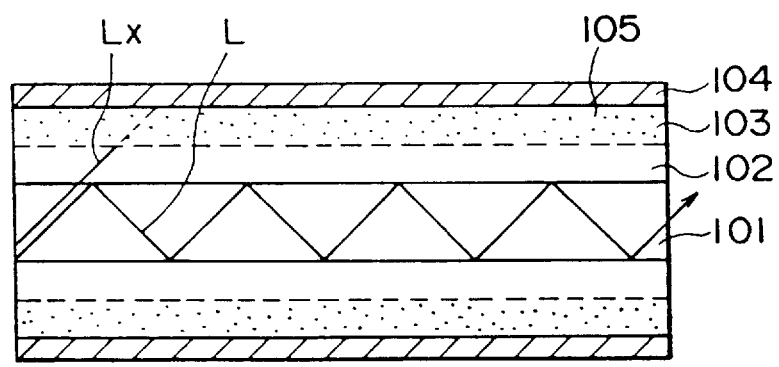
FIG. 12 is a schematic cross-sectional view showing an example of optical transmission in the optical fiber shown in FIG. 11.
Figure 13:
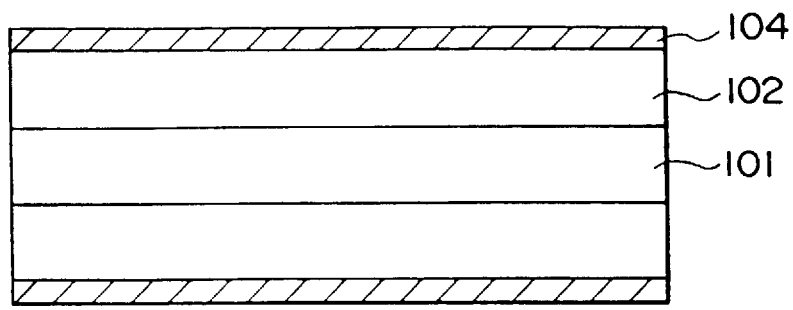
FIG. 13 is a schematic cross-sectional view showing an example of the structure of an optical fiber not having a jacket layer.
Figure 14:
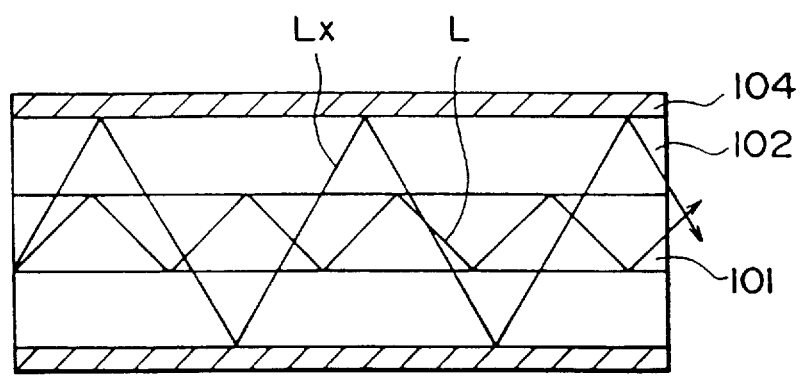
FIG. 14 is a schematic cross-sectional view showing an example of optical transmission in the optical fiber shown in FIG. 13.

Further, as shown in FIGS. 11 and 12, when a light absorbing agent 105 (such as benzotriazole, benzophenone, benzoate, and cyanoacrylate) is incorporated into the jacket layer 103 to be formed on the circumference of the core 101 and the cladding layer 102, stray light $L_x$ (FIG. 14), which can propagate in the cladding layer 102 when propagating light L is incident to an optical fiber having the structure as shown in FIG. 13, can be effectively absorbed.

Further, a light-scattering agent such as $TiO_2$ powder may be incorporated into the jacket layer 103 so as to exhibit its light-scattering function.

Figure 15:
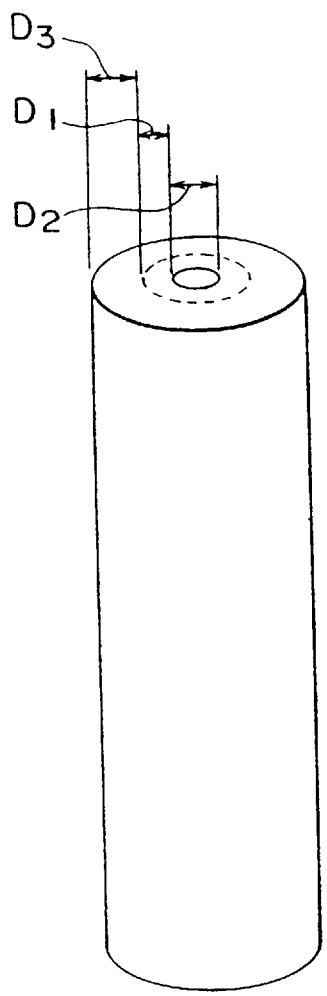
FIG. 15 is a schematic perspective view showing a relationship among a cladding layer (layer thickness: $D_1$), a core (diameter: $D_2$), and a jacket layer (layer thickness: $D_3$).

As shown in FIG. 15, the thickness $D_1$ of the cladding layer in the plastic optical fiber preform to be produced according to the present invention may preferably be not less than 10% and not more than 40% of the diameter $D_2$ of the core further, the thickness $D_3$ of the jacket layer may preferably be greater than the thickness $D_1$ of the cladding layer. When $D_1$ is less than 10% of $D_2$, a part of light for communication also propagates in the jacket layer having a low transparency, so that the transmission performance can be lowered. Most of light for communication propagates in the core but a part of the light for communication spreads to the outside of the core so as to propagate in such a portion. Accordingly, the cladding may preferably has a thickness larger than that of the core to a certain extent.

On the other hand, when $D_1$ exceeds 40% of $D_2$, an expensive material for cladding is also used for a region which does not contribute to the propagation of communication light at all, and therefore such a case is not preferred in view of the production cost.

Figure 16:
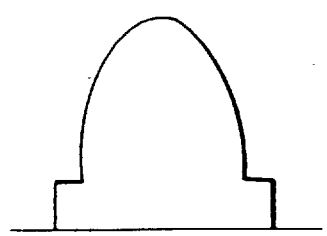
FIG. 16 is a schematic view showing an embodiment of GI-type refractive index distribution of the optical fiber shown in FIG. 15.

In the optical fiber preform provided with the jacket layer in such a manner, it is preferred that a GI-type refractive index distribution is formed so that the refractive index is gradually decreased from the center of the optical fiber preform toward the outer periphery thereof, as shown in FIG. 16. The process for producing such an optical fiber preform is not particularly restricted, but it is preferred to use an inside-surface CVD process or an inside-surface coating process (such as spray coating process) as described above may preferably be used. When a coating process is used, a driving operation may be conducted simultaneously with the coating operation, or the coating and driving operations may be conducted alternately.

Then, the optical fiber preform thus obtained may be subjected to an ordinary fiber drawing procedure (e.g., an operation wherein the optical fiber preform is melted under heating while the preform is vertically maintained), thereby to obtain a desired plastic optical fiber.

There is described an embodiment of the process for producing the above-mentioned preform for plastic optical fiber (provided with a jacket layer) with reference to schematic perspective views of FIGS. 17–20.

FIGS. 17–20 schematically show an example of the coating process (cast coating process), which is different from spray coating or brush coating. In FIGS. 17–20, reference numeral 51 denotes a starting rod, numeral 52 denotes a coating tank, numeral 53 denotes a dryer, and numeral 54 denotes a pipe for supplying a coating solution, respectively.

Referring to FIG. 17, the starting rod 51 is immersed in the coating tank 52 and then pulled up (FIG. 17 and FIG. 18), and thereafter the resultant product is subjected to drying by use or the dryer 53 (FIG. 19). Then, the above steps are treated or considered as one cycle, and while surprising a refractive index-adjusting raw material through the coating solution-supplying pipe 54 for every cycle so as to gradually or sequentially change the concentration of a refractive index-adjusting raw material in the coating tank 52, such a casting operation is repeated, thereby to form a cladding layer. Then, the raw material to be used is replaced with one having a lower purity, and a jacket layer is formed by using such a material. Through such a procedure, there is formed a preform for elastic optical fiber having a jacket layer and having a GI-type distribution as shown in FIG. 16 wherein the refractive index is gradually decreased from the center of the preform toward the outer periphery thereof.

Hereinbelow, the present invention will be described in further detail.

EXAMPLE 1

Referring to FIG. 1, polymethyl methacrylate (PMMA; refractive index $N_a$=1.490) was used as a transparent polymer A, and a hollow cylindrical member 11 comprising the polymer A as a main component was formed.

The above polymer A (PMMA) was dissolved in a solvent (tetrahydrofuran: THF) in a predetermined ratio (concentration: about 30 wt. %) and the resultant solution was poured into a supply tank 14. On the other hand, butyl benzyl phthalate ester as a refractive index modifier B having a refractive index (refractive index $N_b$=1.536) higher than that of the polymer A was dissolved in THF (concentration: about 30 wt. %) to obtain a solution, and the resultant solution was placed in a refractive index modifier tank 15.

The hollow cylindrical member 11 obtained by the above-mentioned procedure was mounted to an unshown rotating device and the vapor of a raw material was uniformly supplied from the supply tank 14 onto the inner surface of the cylindrical member along the axis direction thereof, by use of a nozzle 12.

In the above-mentioned supply of the vapor, the refractive index modifier B was gradually fed (flow rate: about 10 ml/min) from the refractive index modifier tank 15 into the supply tank 14, so that the mixing ratio of the refractive index modifier B was increased at every vapor-supplying operation to sequentially increase the refractive index of the deposition layer based on the vapor. As a result, there was obtained a plastic optical fiber preform 21 (FIG. 4) having a GI-type refractive index distribution in which the refractive index was gradually decreased from the center of the preform toward the outer periphery thereof (as shown in FIG. 5).

EXAMPLE 2

Referring to FIG. 6, polymethyl methacrylate (PMMA; refractive index $N_a$=1.492) was used as a transparent polymer A and hexyl acetate having a refractive index (refractive index $N_c$=1.408) lower than the refractive index ($N_a$) of the polymer A was used as a refractive index modifier C. These two components were mixed (mixing ratio=4:1) to prepare an initial solution. The mixture solution was dissolved in a solvent (tetrahydrofuran: THF) in a concentration of about 30 wt. %, and the resultant solution was poured into a supply tank 14.

Further, a hollow cylindrical member 11 (refractive index: 1.410) was prepared by using a mixture solution having the same composition as that of the above solution, as a main component. On the other hand, the above polymer A was dissolved in THF (concentration: about 30 wt. %) to obtain a solution, and the resultant solution was stored in a refractive index modifier tank 15.

The hollow cylindrical member 11 thus obtained was mounted to an unshown rotating device and the vapor of a raw material was directly supplied from the supply tank 14 onto the inner surface of the hollow cylindrical member 11 through a supply pipe 19 to be deposited thereon.

In the above deposition, the raw material A was gradually fed from the refractive index modifier tank 15 into the supply tank 14, so that the mixing ratio of the raw material A was increased at every deposition operation to gradually increase the refractive index of the deposition layer based on the vapor. As a result, there was obtained a plastic optical fiber preform 21 (FIG. 4) having a GI-type refractive index distribution in which the refractive index was gradually decreased from the center of the preform toward the outer periphery thereof (as shown in FIG. 5).

<Evaluation of transmission property>

Each of the preforms obtained in above Examples 1 and 2 was drawn under melting by a conventional drawing process to prepare an all-plastic optical fiber (APF) having a diameter of 1 mm and a length of 100 m. Each of these fibers was evaluated with respect to transmission loss and band at a wavelength of 0.658 μm. The thus obtained evaluation results are shown in the following table (Table 1). in this evaluation, a laser diode (LD) Having a wavelength of 0.658 μm was used as a light source for measurement of both the transmission loss and the band. Further, the band was measured by use of an FFT type optical oscilloscope (manufactured by Hamamatsu photonics k.k.) while pulses with a half-value width of 60 psec were generated in the light source.

TABLE 1

|  | <Example 1> | <Example 2> |
| --- | --- | --- |
| Transmission loss (dB/km) | 100 | 120 |
| Transmission band (MHz • km) | 800 | 800 |

EXAMPLE 3
(production of fiber preform by inside-surface CVD)

Referring to FIG. 1, a glass cylindrical member 11 having an inner diameter of 50 mm and an outer diameter of 52 mm was prepared, and a glass pipe having an inner diameter of 4 mm and an outer diameter of 5 mm was fixed at a position corresponding to the center of the cylindrical member. The glass pipe used herein had holes bored therein and having a diameter of 1 mm at intervals of 5 mm.

First, methyl methacrylate (MMA) and an initiator (benzil methyl ketal) were heated to 80° C., and the vapor of these materials was introduced into the above-mentioned glass pipe. The vapor ejected from the glass pipe was attached to the inner surface of the above glass cylindrical member. The glass cylindrical member was rotated at a rotational speed of about one rotation per minute.

When the vapor attached to the inner surface of the glass cylindrical member was heated at 100° C. by use of a ring heater, a cladding layer (thickness: 5 mm) was formed on the basis of the polymerization of the above-mentioned methyl methacrylate.

With respect to the formation of a core, methyl methacrylate and an initiator were introduced into the glass pipe provided with the cladding layer formed above, and were subjected to polymerization under the same conditions as those for the formation of the above cladding layer, except for controlling the mixing ratio of a dopant (butyl benzyl phthalate ; BBP). At the time of the control of the mixing ratio of the dopant, a solution of the dopant (concentration: about 30 wt. %) was placed in a dopant vessel 15, and was supplied at 10 ml/min from the vessel to the supply tank 14 in the formation of the above core.

Figure 21:
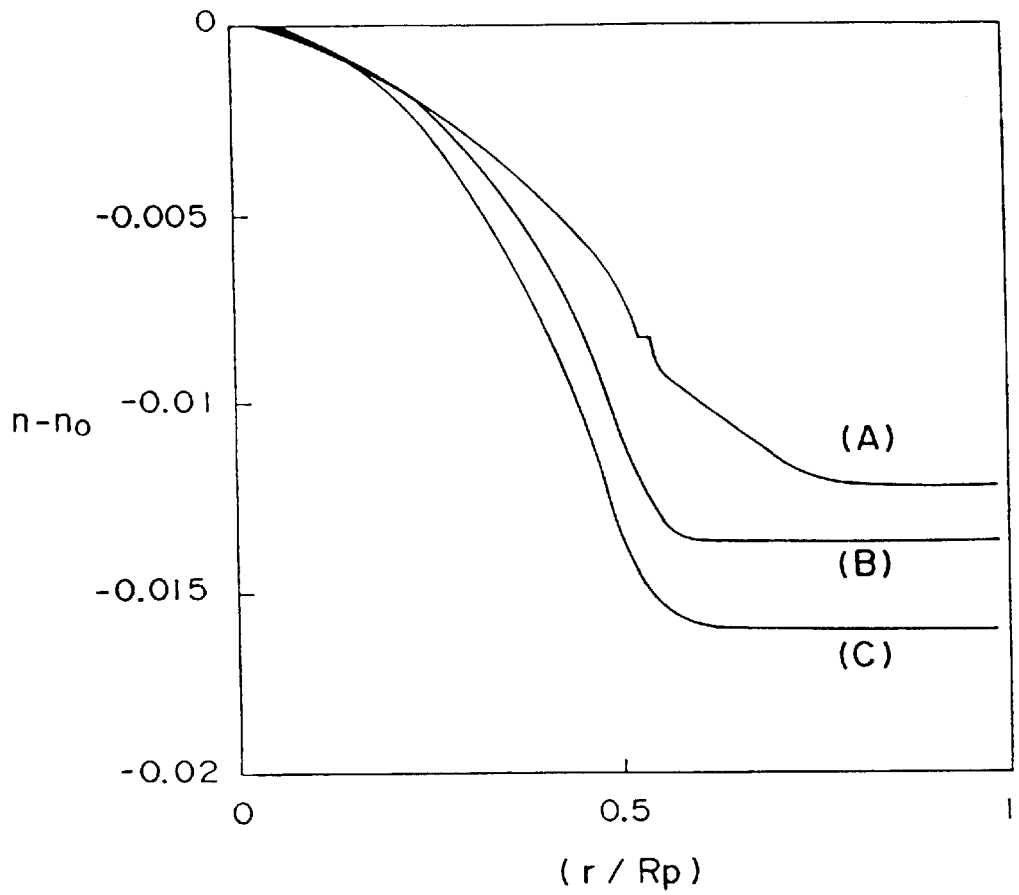
FIG. 21 is a graph showing a refractive index distribution of each of the optical fibers obtained in Examples 3 and 6.

After the glass pipe 11 was removed from the deposition product thus obtained, the resultant product was subjected to collapse under heating at 100° C., thereby to obtain a base material (preform) having a refractive index distribution as shown in a graph of FIG. 21. In FIG. 21, the abscissa (r/Rp) represents a distance from the core center (in terms of a relative value with respect to "25 mm"=1 (one) unit) and the ordinate (n–n₀) represents a relative refractive index difference with respect to the refractive index of the cladding. In the graph of FIG. 21, the curve A shows the refractive index distribution of a preform in which a mixing ratio in the neighborhood of the core center is MMA/BBP=7/1, the curve B shows the refractive index distribution of a preform in which the mixing ratio in the neighborhood of the core center is MMA/BBP =6/1, and the curve C shows a refractive index distribution of a preform in which the mixing ratio in the neighborhood of the core center is MMA/BBP=5/1.

EXAMPLE 4

Referring to FIG. 7, polymethyl methacrylate (PMMA; refractive index $N_a$=1.490) was used as a transparent polymer A to form a hollow cylindrical member 31 mainly comprising the polymer A.

The polymer A (PMMA) was dissolved in a solvent (tetrahydrofuran: THF) in a predetermined ratio (concentration: about 30 wt. %) and the resultant solution was poured into a supply tank 34. On the other hand, butyl benzyl phthalate as a refractive index modifier B having a refractive index (refractive index $N_b$=1.536) higher than that of the polymer A was dissolved in THF (concentration: about 30 wt. %) to obtain a solution, and the resultant solution was stored in a refractive index modifier tank 35.

The hollow cylindrical member 31 obtained by the above procedure was mounted to an unshown rotating device and the solution of raw material from the supply tank 14 was sprayed uniformly on the inner surface of the cylindrical member along the axis direction thereof, by use of a nozzle 32.

In the above spraying operation, the refractive index modifier B was gradually fed (flow rate: about 10 ml/min) from the refractive index modifier tank 35 into the supply tank 34, so that the mixing ratio of the refractive index modifier B was increased at every spraying operation to gradually increase the refractive index of the spraying solution. When such an operation was repeated 100 times, there was obtained a plastic optical fiber preform 21 (FIG. 4) having a GI-type refractive index distribution in which the refractive index was gradually decreased from the center of the preform toward the outer periphery thereof (as shown in FIG. 5).

EXAMPLE 5

Referring to FIG. 7, polymethyl methacrylate (PMMA; refractive index $N_a$=1.492) was used as a transparent polymer A, and hexyl acetate having a refractive index (refractive index $N_c$=1.408) lower than the refractive index ($N_a$) of the polymer A was used as a refractive index modifier C. These two components were mixed (mixing ratio=4:1) to prepare an initial solution. Thus obtained mixture solution was dissolved in a solvent (tetrahydrofuran: THF) in a concentration of about 30 wt. % and the resultant solution was poured into a supply tank 34.

Further, a hollow cylindrical member (refractive index: 1.410) 31 was prepared by using a mixture solution having the same composition as that of the mixture solution described above, as a main component. On the other hand, the above polymer A was dissolved in THF (concentration: about 30 wt. %) to obtain a solution, and the resultant solution was stored in a refractive index modifier tank 35.

The hollow cylindrical member 31 thus obtained was mounted to an unshown rotating device and the raw material from the supply tank 34 was sprayed uniformly onto the inside surface of the hollow cylindrical member 31 along the axis direction thereof, by use of the nozzle 32.

At the time of the spraying operation, the raw material A was gradually fed from the refractive index modifier tank 35 into the supply tank 34, so that the mixing ratio of the raw material A was increased at every spraying operation to gradually increase the refractive index of the spraying solution. When this operation was repeated 100 times, there was obtained a plastic optical fiber preform 21 (FIG. 4) having a GI-type refractive index distribution in which the refractive index was gradually decreased from the center of the preform toward the outer periphery thereof (as shown in FIG. 5).

<Evaluation of transmission property>

Each of the preforms obtained in above Examples 4 and 5 was drawn under melting by a conventional drawing process to prepare an all-plastic optical fiber (APF) having a diameter of 1 mm and a length of 100 m. Each of these fibers was evaluated with respect to transmission loss and band au a wavelength of 0.658 μm. The thus obtained evaluation results are shown in the following table (Table 2).

In this evaluation, a laser diode (LD) having a wavelength of 0.658 μm was used as a light source for measurement of both the transmission loss and the band. Further, the band was measured by use of an FFT type optical oscilloscope (manufactured by Hamamatsu photonics k.k.) while pulses with a half-value width of 60 psec were generated in the light source.

TABLE 2

|  | <Example 4> | <Example 5> |
| --- | --- | --- |
| Transmission loss (dB/km) | 150 | 160 |
| Transmission band (MHZ • km) | 700 | 800 |

EXAMPLE 6
(production of fiber preform by coating process)

Referring to FIG. 8, a glass cylindrical member 31 having an inner diameter of 50 mm and an outer diameter of 52 mm was prepared, and a glass pipe 32a having an inner diameter of 4 mm and an outer diameter of 5 mm was fixed at a position corresponding to the center of the cylindrical member. The glass pipe used herein had holes bored therein and having a diameter of 1 mm at intervals of 5 mm.

First, a THF solution (concentration: about 30 wt. %) of polymethyl methacrylate (PMMA) was placed in a supply tank 34, and the solution was supplied into the glass pipe 32a (flow rate: about 10 ml/min). The solution was uniformly sprayed from the pipe 32a onto the inside surface of the glass cylindrical member 31 along the axis direction thereof. The glass cylindrical member was rotated at a rotational speed of about one rotation per minute.

When the solution attached to the inner surface of the glass cylindrical member was heated at 100° C. by means of a heater 33, a cladding layer (thickness: 5 mm) was formed on the basis of the spraying of the above solution of polymer A.

With respect to the formation of a core, the above methyl methacrylate solution was introduced into the glass pipe 31 provided with the cladding layer formed above, and was subjected to spraying under the same conditions as those for the formation of the above cladding layer, except for controlling the mixing ratio of a dopant (butyl benzyl phthalate ; BBP). At the time of the control of the mixing ratio of the dopant, a solution of the dopant (concentration: about 30 wt. %) was placed in a dopant vessel 35, and was supplied at about 10 ml/min from the vessel to the supply tank 34 in the formation of the above core.

After the glass pipe 31 was removed from the deposition product thus obtained, the resultant product was subjected to collapse under heating at 100° C., thereby to obtain a preform. In the thus obtained preforms, the mixing ratio in the neighborhood of the core center was MMA/BBP=7/1, 6/1 and 5/1, respectively. Each of these preforms had a refractive index distribution which was substantially comparable to that shown in the above-mentioned graph of FIG. 21.

EXAMPLE 7

By use of a fiber drawing apparatus as shown in FIG. 9, a plastic optical fiber preform 40 provided with a GI-type refractive index distribution was subjected to a fiber drawing operation More specifically, the above preform 40 was inserted into a fiber drawing furnace 41 in which the temperature in the core tube was set to 240° C., and was subjected to fiber drawing at a linear velocity of 2 m/min so as to provide a center value of the resultant outer diameter of 650 μm. The drawing tension used herein was 20 g.

When the tensile strength of the thus prepared fiber 46 was measured, it was found to be 2.3 Kg/mm$^2$. When a length of 1 m of the fiber was wound up with a tension of 50 g around a mandrel having a diameter of 10 mm, the period of time until the breakage thereof was 10 days.

EXAMPLE 8

Referring to FIG. 9, a plastic optical fiber preform 40 provided with a GI-type refractive index distribution was provided and was inserted into a fiber drawing furnace 41 in which the temperature in the core tube was set to 230° C., and was subjected to fiber drawing at a linear velocity of 2 m/min so as to provide a center value of the resultant outer diameter of 650 μm. The drawing tension used herein was 40 g.

When the tensile strength of the thus prepared fiber 46 was measured, it was found to be 2.4 Kg/mm$^2$. When a length of 1 m of the fiber was wound up with a tension of 50 g around a mandrel having a diameter of 10 mm, the period of time until the breakage thereof was 12 days.

EXAMPLE 9

Referring to FIG. 9, a plastic optical fiber preform 40 provided with a GI-type refractive index distribution was provided and was inserted into a fiber drawing furnace 41 in which the temperature in the core tube was set to 250° C., and was subjected to fiber drawing at a linear velocity of 2 m/min so as to provide a center value of the resultant outer diameter of 650 μm. The drawing tension used herein was 15 g.

When the tensile strength of the thus prepared fiber 46 was measured, it was found to be 2.3 Kg/mm$^2$. When a length of 1 m of the fiber was wound up with a tension of 50 g around a mandrel having a diameter of 10 mm, the period of time until the breakage thereof was 8 days.

Comparative Example 1

Referring to FIG. 9, a plastic optical fiber preform 40 provided with a GI-type refractive index distribution was provided and was inserted into a fiber drawing furnace 41 in which the temperature in the core tube was set to 260° C., and was subjected to fiber drawing at a linear velocity or 2 m/min so as to provide a center value of the resultant outer diameter of 650 μm. The drawing tension used herein was 8 g.

When the tensile strength of the thus prepared fiber 46 was measured, it was found to be 1.5 Kg/mm$^2$. When a length of 1 m of the fiber was wound up with a tension of 50 g around a mandrel having a diameter of 10 mm, the period of time until the breakage thereof was 10 hours.

Comparative Example 2

Referring to FIG. 9, a elastic optical fiber preform 40 provided with a GI-type refractive index distribution was provided and was inserted into a fiber drawing furnace 41 in which the temperature in the core tube was set to 260° C., and was subjected to fiber drawing at a linear velocity of 1.5 m/min so as to provide a center value of the resultant outer diameter of 650 μm. The drawing tension used herein was 6 g.

When the tensile strength of the thus prepared fiber 46 was measured, it was found to be 1.3 Kg/mm$^2$. When a length of 1 m of the fiber was wound up with a tension of 50 g around a mandrel having a diameter of 10 mm, the period of time until the breakage thereof was 8 hours.

Comparative Example 3

Referring to FIG. 9, a plastic optical fiber preform 40 provided with a GI-type refractive index distribution was provided and was inserted into a fiber drawing furnace 41 in which the temperature in the core tube was set to 270° C., and was subjected to fiber drawing at a linear velocity of 2 m/min so as to provide a center value of the resultant cuter diameter of 650 µm. The drawing tension used herein was 5 g.

When the tensile strength of the thus prepared fiber 46 was measured, it was found to be 1.0 Kg/mm$^2$. When a length of 1 m of the fiber was wound up with a tension of 50 g around a mandrel having a diameter of 10 mm, the period of time until the breakage thereof was 3 hours.

Comparative Example 4

Referring to FIG. 9, a plastic optical fiber preform 40 provided with a GI-type refractive index distribution was provided and was inserted into a fiber drawing furnace 41 in which the temperature in the core tube was set to 275° C., and was subjected to fiber drawing at a linear velocity of 2 m/min so as to provide a center value of the resultant outer diameter of 1100 µm. The drawing tension used herein was 5 g.

When the tensile strength of the thus prepared fiber 46 was measured, it was found to be 2.2 Kg/mm$^2$. When a length of 1 m of the fiber was wound up with a tension of 50 g around a mandrel having a diameter of 10 mm, the period of time until the breakage thereof was 10 days, and substantially no decrease in the strength was observed.

EXAMPLE 10

Referring to FIG. 9, a preform for plastic optical fiber 40 having a GI-type refractive index distribution was provided and was inserted into a fiber drawing furnace 41 in which the heater 42 comprised a carbon heater having a length of heating zone of 10 mm and the temperature in the core tube was set at 220° C.

When the above preform was subjected to fiber drawing at a linear velocity of 2 m/min so as to provide a center value of the resultant outer diameter of 650 µm. The resultant fluctuation in the outer diameter was ±30 µm. At the time of the above fiber drawing operation, the drawing tension was set to 70 g.

When the transmission loss of the thus prepared GI-type plastic optical fiber 46 was measured, it was found to be 200 dB/km at a wavelength of 650 nm.

Then, the above fiber was subjected to a deterioration treatment at 80° C. for one day (24 hours), and then the shrinkage retention (retention in shrinkage) and transmission loss thereof were measured. As a result, they were found to be 99% and 210 dB/km, respectively. In other words, substantially no shrinkage due to heat was observed, and the fluctuation in the transmission loss was little. The results of the measurement of the transmission loss are shown in a graph of FIG. 22.

EXAMPLE 11

Referring to FIG. 9, a preform for plastic optical fiber 40 having a GI-type refractive index distribution was provided and was inserted into a fiber drawing furnace 41 in which the heater 42 comprised a carbon heater having a length of heating zone of 10 mm and the temperature in the core tube was set at 220° C.

When the above preform was subjected to fiber drawing at a linear velocity of 3 m/min so as to provide a center value of the resultant outer diameter of 650 µm. The resultant fluctuation in the outer diameter was ±30 µm. At the time of the above fiber drawing operation, the drawing tension was set to 85 g.

When the transmission loss of the thus prepared GI-type plastic optical fiber 46 was measured, it was found to be 210 dB/km. at a wavelength of 650 nm.

Then, the above fiber was subjected to a deterioration treatment at 80° C. for one day, and then the shrinkage retention and transmission loss thereof were measured. As a result, they were found to be 99% and 190 dB/km, respectively. In other words, substantially no shrinkage due to heat was observed, and the fluctuation in the transmission loss was little. The results of the measurement of the transmission loss are shown in a graph of FIG. 22.

EXAMPLE 12

Referring to FIG. 9, a preform for plastic optical fiber 40 having a GI-type refractive index distribution was provided and was inserted into a fiber drawing furnace 41 in which the heater 42 comprised a carbon heater having a length of heating zone of 10 mm and the temperature in the core tube was set at 230° C.

When the above preform was subjected to fiber drawing at a linear velocity of 2 m/min so as to provide a center value of the resultant outer diameter of 650 µm. The resultant fluctuation in the outer diameter was ±30 µm. At the time of the above fiber drawing operation, the drawing tension was set to 50 g.

When the transmission loss of the thus prepared GI-type plastic optical fiber 46 was measured, it was found to be 220 dB/km at a wavelength of 650 nm.

Then, the above fiber was subjected to a deterioration treatment at 80° C. for one day, and then the shrinkage retention and transmission loss thereof were measured. As a result, they were found to be 98% and 210 dB/km, respectively. In other words, substantially no shrinkage due to heat was observed, and the fluctuation in the transmission loss was little. The results of the measurement of the transmission loss are shown in a graph of FIG. 22.

EXAMPLE 13

Referring to FIG. 9, a preform for plastic optical fiber 40 having a GI-type refractive index distribution was provided and was inserted into a fiber drawing furnace 41 in which the heater 42 comprised a heater comprising carbon resistance (carbon heater) having a length of heating zone of 10 mm and the temperature in the core tube was set at 210° C.

When the above preform was subjected to fiber drawing at a linear velocity of 2 m/min so as to provide a center value of the resultant outer diameter of 650 µm. The resultant fluctuation in the outer diameter was ±30 µm. At the time of the above fiber drawing operation, the drawing tension was set to 100 g.

When the transmission loss of the thus prepared GI-type plastic optical fiber 46 was measured, it was found to be 200 dB/km at a wavelength of 650 nm.

Then, the above fiber was subjected to a deterioration treatment at 80° C. for one day, and then the shrinkage retention and transmission loss thereof were measured. As a result, they were found to be 97% and 230 dB/km, respectively. In other words, substantially no shrinkage due to heat was observed, and the fluctuation in the transmission loss was little. The results of the measurement of the transmission loss are shown in a graph of FIG. 22.

Comparative Example 5

Referring to FIG. 9, a preform for plastic optical fiber 40 having a GI-type refractive index distribution was provided and was inserted into a fiber drawing furnace 41 in which the temperature in the core tube was set to 200° C.

When the above preform was subjected to fiber drawing at a linear velocity of 2 m/min so as to provide a center value of the resultant outer diameter of 650 μm. At the time of the above fiber drawing operation, the drawing tension was set to 120 g.

When the transmission loss of the thus prepared GI-type plastic optical fiber 46 was measured, it was found to be 200 dB/km at a wavelength of 650 nm.

Then, the above fiber was subjected to a deterioration treatment at 80° C. for one day, and then the shrinkage retention and transmission loss thereof were measured. As a result, they were found to be 90% and 300 dB/km, respectively. In other words, a somewhat larger shrinkage due to heat was observed, and the fluctuation in the transmission Moss was also large. The results of the measurement of the transmission loss are shown in a graph of FIG. 22.

Comparative Example 6

Referring to FIG. 9, a preform for plastic optical fiber 40 having a GI-type refractive index distribution was provided and was inserted into a fiber drawing furnace 41 in which the temperature in the core tube was set to 200° C.

When the above preform was subjected to a fiber drawing at a linear velocity 3 m/min so as to provide a center value of the resultant outer diameter of 650 μm. At the time of the above finer drawing operation, the drawing tension was set to 150 g.

When the transmission loss of the thus prepared GI-type plastic optical fiber 46 was measured, it was found to be 230 dB/km at a wavelength of 650 nm.

Then, the above fiber was subjected to a deterioration treatment at 80° C. for one day, and then the shrinkage retention and transmission loss thereof were measured. As a result, they were found to be 90% and 350 dB/km, respectively. In other words, a somewhat larger shrinkage due to heat was observed, and the fluctuation in the transmission loss was also large. The results of the measurement of the transmission loss are shown in a graph of FIG. 22.

Comparative Example 7

Referring to FIG. 9, a preform for plastic optical fiber 40 having a GI-type refractive index distribution was provided and was inserted into a fiber drawing furnace 41 in which the temperature in the core tube was set to 220° C.

When the above preform was subjected to fiber drawing at a linear velocity of 4 m/min so as to provide a center value of the resultant outer diameter of 650 μm. At the time of the above fiber drawing operation, the drawing tension was set to 130 g.

When the transmission loss of the thus prepared GI-type plastic optical fiber 46 was measured, it was found to be 240 dB/km at a wavelength of 650 nm.

Then, the above fiber was subjected to a deterioration treatment at 80° C. for one day, and then the shrinkage retention and transmission loss thereof were measured. As a result, they were found to be 80% and 400 dB/km, respectively. In other words, a somewhat larger shrinkage due to heat was observed, and the fluctuation in the transmission loss was also large. The results of the measurement of the transmission loss are shown in a graph of FIG. 22.

Figure 22:
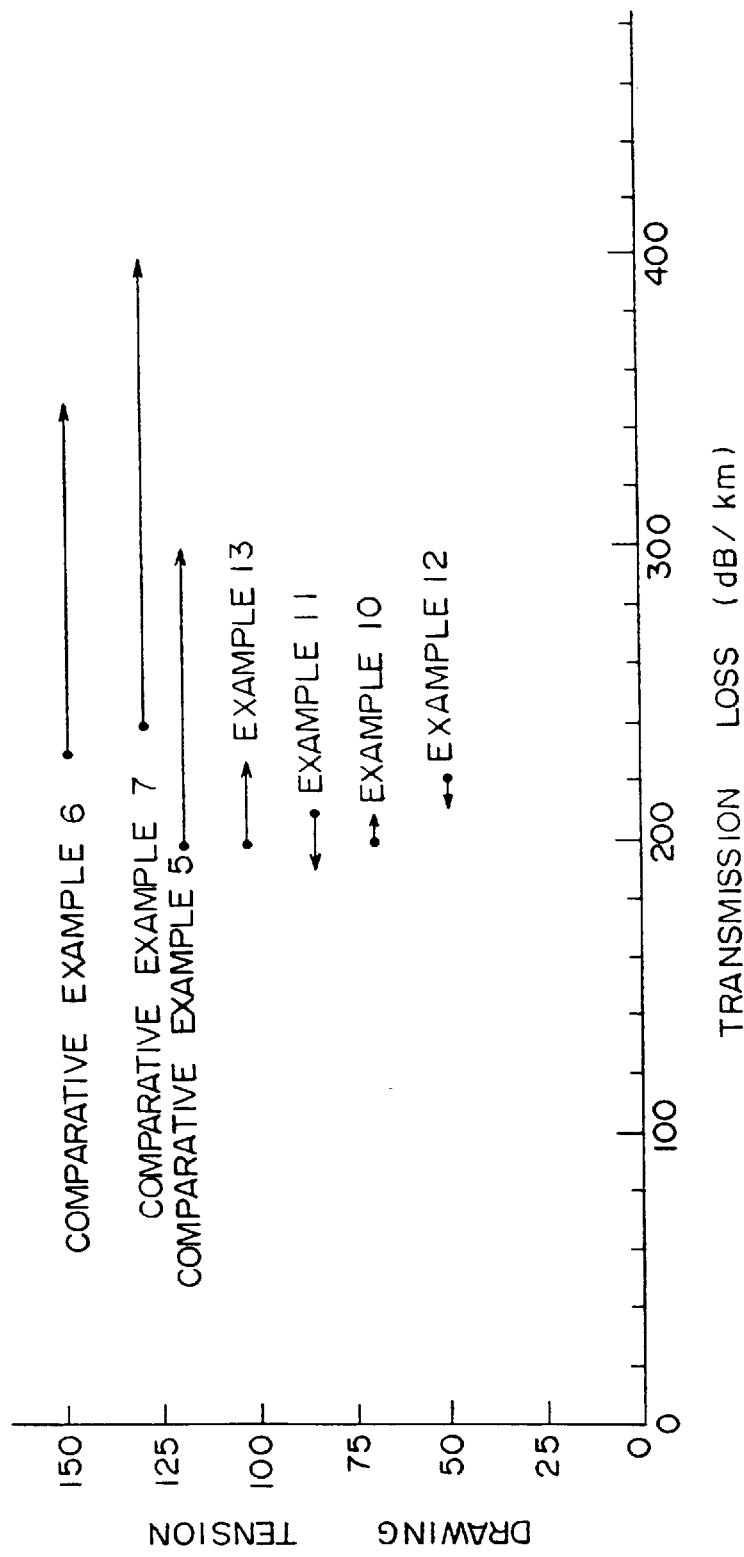
FIG. 22 is a graph showing a relationship between fiber drawing tension and transmission loss in each of the optical fibers obtained in Examples 10–13 and Comparative Examples 5–7.
Figure 23:
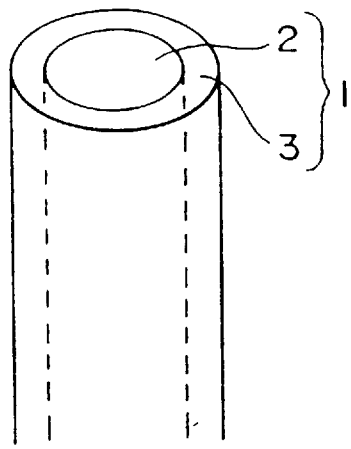
FIG. 23 is a schematic perspective view showing an example of the structure of a conventional plastic optical fiber preform.
Figure 24:
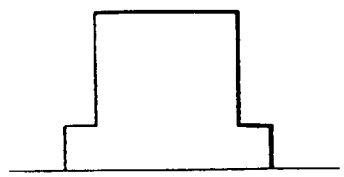
FIG. 24 is a schematic view showing an SI-type refractive index distribution.
Figure 25:
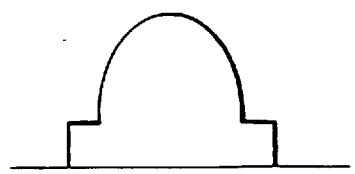
FIG. 25 is a schematic view showing a GI-type refractive index distribution.

As shown in the graph of FIG. 22 described above, in the drawing of a plastic optical fiber conducted in the above Examples 10–13, the fiber drawing was conducted while the fiber drawing tension was set to 100 g or less, whereby an optical fiber having a smaller shrinkage retention and a smaller fluctuation in the transmission loss could be obtained, as compared with the fiber obtained in Comparative Examples 5–7. In other words, in these Examples, it was found that the shrinkage after heat deterioration was controlled and the increase in transmission loss was reduced.

INDUSTRIAL APPLICABILITY

As described hereinabove, according to the present invention, it is possible to easily accomplish the control of a refractive index distribution which has been troublesome in the prior art, and to provide a GI-type plastic optical fiber preform with good reproducibility.

In the present invention, in a case where the tension for drawing is set to a value of 10 g or more at the time of the production or a plastic optical fiber based on drawing (particularly, when the outer diameter of the resultant fiber is 1000 μm or less), it is possible to further improve the resultant fiber in mechanical strength and long-term reliability.

Further, in the present invention, in a case where the tension for drawing is set to a value of 100 g or less at the time of the production of a plastic optical fiber based on drawing, the shrinkage of the resultant fiber can be suppressed and the increase in the transmission loss can be suppressed even after the heat deterioration thereof.

Furthermore, according to the present invention, the following effects may be achieved even in the case of a plastic optical fiber preform having a jacket layer.

(1) In a case where a fiber preform comprising a plastic material is prepared by using a substance having the same material quality and having a high purity for all portions of the fiber preform, the production cost inevitably becomes higher. However, in a case where the neighborhood of the circumference of the cladding layer which does not contribute to light transmission is constituted by using a jacket layer having a lower purity, the resultant production cost may be decreased, for example, even when an optical fiber preform having the same specification or standard is produced, a part thereof can be formed by using a material having a lower purity, thereby to further reduce the production cost.

(2) Further, in an embodiment in which a functional material such as anti-oxidant, light absorbing agent, and light scattering agent is incorporated in the above jacket layer, it is easy to obtain a plastic optical fiber having any of such various functions.

(3) In an embodiment in which a refractive index modifier is incorporated in the same manner as described above, it is easy to obtain a GI-type plastic optical fiber preform in the same manner as in the formation of the above jacket layer.

We claim:

1. A preform for plastic optical fiber, comprising:

a core comprising an organic polymer;

a cladding layer comprising an organic polymer and disposed on the outer circumference of the core; and a jacket layer disposed on the outer circumference of the cladding layer;

wherein a refractive index modifier b having a refractive index higher than the polymer of the core is optionally added to the core, and a refractive index modifier c having a refractive index lower than the organic polymer of the cladding is optionally added to the cladding layer so that the refractive index of the preform gradually decreases from the center outward, and the core has a higher refractive index than the cladding layer.

2. A preform for plastic optical fiber, comprising:

a core comprising an organic polymer;

a cladding layer comprising an organic polymer and disposed on the outer circumference of the core; and a jacket layer disposed on the outer circumference of the cladding layer;

wherein a refractive index modifier b having a refractive index higher than the polymer of the core is optionally added to the core, and a refractive index modifier c having a refractive index lower than the organic polymer of the cladding is optionally added to the cladding layer so that the refractive index of the preform gradually decreases from the center outward, and the core has a higher refractive index than the cladding layer; and wherein the jacket layer further comprises a functional material.

3. A preform for plastic optical fiber according to claim 2, wherein the functional material comprises at least one material selected from the group consisting of an antioxidant, a light absorbing agent and a light scattering agent.

4. A preform for plastic optical fiber according to claim 1, wherein the cladding layer has a thickness of not less than 10% and not more than 40% of the diameter of the core.

5. A preform for plastic optical fiber according to claim 1, wherein the jacket layer has a thickness which is greater than the thickness of the cladding layer.

6. A preform for plastic optical fiber according to claim 1, wherein the jacket layer comprises an organic polymer that contains at least 95 mol % of the same monomer or monomers as the monomer or monomers of the organic polymer constituting the cladding layer.

7. A preform for plastic optical fiber according to claim 1, wherein the difference between the melting point of the organic polymer of the jacket layer and the melting point of the organic polymer of the core layer is less than 10° C.

8. A preform for plastic optical fiber according to claim 1, wherein the jacket layer further comprises a light absorbing agent selected from the group consisting of benzotriazole, benzophenone, benzoate and cyanoacrylate.

9. A preform for plastic optical fiber according to claim 1, wherein the organic polymer is comprised of one or more monomers selected from the group consisting of: methacrylates; acrylates; monofunctional acrylates and methacrylates; fluorine-containing acrylates and methacrylates; polyfunctional acrylates and methacrylates; acrylic acid; methacrylic acid; styrene; chlorostyrene; and mixtures thereof.

10. A preform for plastic optical fiber according to claim 9, wherein the organic polymer is polymethyl methacrylate.

11. A preform for plastic optical fiber according to claim 9, wherein the organic polymer is polycarbonate.

12. A preform for plastic optical fiber, comprising:

a core comprising an organic polymer;

a cladding layer comprising an organic polymer and disposed on the outer circumference of the core; and a jacket layer disposed on the outer circumference of the cladding layer;

wherein a refractive index modifier b having a refractive index higher than the polymer of the core is optionally added to the core, and a refractive index modifier c having a refractive index lower than the organic polymer of the cladding is optionally added to the cladding layer so that the refractive index of the preform gradually decreases from the center outward, and the core has a higher refractive index than the cladding layer; and wherein the jacket layer further comprises a light absorbing agent.

13. A preform for plastic optical fiber according to claim 12, wherein the light absorbing agent is selected from the group consisting of hindered phenol, hindered amine, aryl amine, phosphite and thio ether.

14. A preform for plastic optical fiber, comprising:

a core comprising an organic polymer;

a cladding layer comprising an organic polymer and disposed on the outer circumference of the core; and a jacket layer disposed on the outer circumference of the cladding layer;

wherein a refractive index modifier b having a refractive index higher than the polymer of the core is optionally added to the core, and a refractive index modifier c having a refractive index lower than the organic polymer of the cladding is optionally added to the cladding layer so that the refractive index of the preform gradually decreases from the center outward, and the core has a higher refractive index than the cladding layer; and wherein the jacket layer further comprises $TiO_2$ as light scattering agent.

15. A preform for plastic optical fiber according claim 1, wherein the organic polymer of the core is polymethyl methacrylate and the refractive index modifier b is selected from the group consisting of butyl benzyl phthalato, 2-phenylethyl acetate, dimethyl phthalato, diphenyl sulfide, vinyl benzoate, benzyl methacrylate and diallyl phthalate.

16. A preform for plastic optical fiber, comprising:

a core comprising an organic polymer;

a cladding layer comprising an organic polymer and disposed on the outer circumference of the core; and a jacket layer disposed on the outer circumference of the cladding layer;

wherein a refractive index modifier b having a refractive index higher than the polymer of the core is optionally added to the core, and a refractive index modifier c having a refractive index lower than the organic polymer of the cladding is optionally added to the cladding layer so that the refractive index of the preform gradually decreases from the center outward, and the core has a higher refractive index than the cladding layer; and wherein the organic polymer of the cladding layer is polymethyl methacrylate and the refractive index modifier c is selected from the group consisting of hexyl acetate, bis(3,5,5-methylhexyl) phthalate and bis(2-methylhexyl)phthalate.

17. A preform for plastical optical fiber according to claim 1, wherein the organic polymer of the core is polymethyl methacrylate and the refractive index modifier b is butyl benzyl phthalate.

18. A preform for plastic optical fiber comprising:

a core comprising a first organic polymer;

a cladding layer comprising a second organic polymer and disposed on the outer circumference of said core; and a jacket layer comprising a third organic polymer and disposed on the outer circumference of said cladding layer;

wherein said third organic polymer comprises at least 90 mol % of the same monomer or monomers as contained in said second organic polymer and has a melting point substantially the same as that of the first organic polymer; and wherein a refractive index modifier b having a refractive index higher than the first organic polymer is optionally added to the core so that the refractive index of the preform gradually decreases from the center outward, and the core has a higher refractive index than the cladding layer.

19. A preform for plastic optical fiber as recited in claim 18 wherein a refractive index modifier c having a refractive index lower than the second organic polymer is added to the cladding layer.

* * * * *

UNITED STATES PATENT AND TRADEMARK OFFICE
CERTIFICATE OF CORRECTION

PATENT NO.  : 5,851,666
DATED       : December 22, 1998
INVENTOR(S) : Tsuyoshi NONAKA, et al.

It is certified that error appears in the above-identified patent and that said Letters Patent is hereby corrected as shown below:

On the title page, item [30] insert the following:

--Foreign Application Priority Data
       June 16, 1985  [JP]  Japan ........ 5-144678
       June 18, 1993  [JP]  Japan ........ 5-451776
       Feb. 22, 1994  [JP]  Japan ........ 6-024137
       Feb. 23, 1994  [JP]  Japan ........ 6-027743--.

Signed and Sealed this

Twenty-seventh Day of July, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,851,666
DATED : December 22, 1998
INVENTOR(S) : Tsuyoshi NONAKA, et al.

It is certified that error appears in the above-identified patent and that said Letters Patent is hereby corrected as shown below:

On the title page, item [30] should read as follows:

```
--Foreign Application Priority Data
        June 16, 1993  [JP] Japan ........ 5-144678
        June 18, 1993  [JP] Japan ........ 5-147278
        June 23, 1993  [JP] Japan ........ 5-151776
        Feb. 22, 1994  [JP] Japan ........ 6-024137
        Feb. 25, 1994  [JP] Japan ........ 6-027743--.
```

This Certificate supersedes Certificate of Correction issued July 27, 1999.

Signed and Sealed this

Eighteenth Day of January, 2000

Attest:

Q. TODD DICKINSON

*Attesting Officer*   *Commissioner of Patents and Trademarks*